(12) United States Patent
Nakaishi et al.

(10) Patent No.: US 10,243,364 B2
(45) Date of Patent: Mar. 26, 2019

(54) CONTROL DEVICE, CONTROL METHOD, AND PROGRAM

(71) Applicant: NEC Corporation, Tokyo (JP)

(72) Inventors: Hiroshi Nakaishi, Tokyo (JP); Yukiko Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 15/312,548

(22) PCT Filed: Apr. 27, 2015

(86) PCT No.: PCT/JP2015/062698
§ 371 (c)(1),
(2) Date: Nov. 18, 2016

(87) PCT Pub. No.: WO2015/178169
PCT Pub. Date: Nov. 26, 2015

(65) Prior Publication Data
US 2017/0104330 A1    Apr. 13, 2017

(30) Foreign Application Priority Data

May 19, 2014   (JP) .................................. 2014-103116

(51) Int. Cl.
*H02J 13/00* (2006.01)
*H02J 3/14* (2006.01)
*H02J 3/00* (2006.01)

(52) U.S. Cl.
CPC ............ *H02J 3/14* (2013.01); *H02J 13/00* (2013.01); *H02J 13/0006* (2013.01); *H02J 13/0079* (2013.01); *H02J 2003/007* (2013.01); *Y02B 70/3225* (2013.01); *Y02E 60/76* (2013.01); *Y04S 20/222* (2013.01); *Y04S 40/22* (2013.01)

(58) Field of Classification Search
USPC ......................................................... 307/52
See application file for complete search history.

(56) References Cited

U.S. PATENT DOCUMENTS

2012/0016528 A1* 1/2012 Raman ................. G06F 9/5094
                                                        700/291
2012/0112696 A1* 5/2012 Ikeda ................. B60L 11/1816
                                                        320/109

FOREIGN PATENT DOCUMENTS

| JP | 4-312198 | 11/1992 |
|---|---|---|
| JP | 5-114077 | 5/1993 |
| JP | 8-7167 | * 1/1996 |
| JP | 8-124014 | * 5/1996 |
| JP | 8-161623 | 6/1996 |

(Continued)

OTHER PUBLICATIONS

International Search Report and Written Opinion dated Jul. 14, 2015, in corresponding PCT International Application.

*Primary Examiner* — Rexford Barnie
*Assistant Examiner* — Xuan Ly
(74) *Attorney, Agent, or Firm* — Finnegan, Henderson, Farabow, Garrett & Dunner, L.L.P.

(57) ABSTRACT

A control device (100) includes a communication unit (102) which receives power consumption information of a power control target from an electric energy meter, an acquisition unit (104) which acquires demand control information from at least one power supply source, and a control unit (106) which controls operation of the power control target based on the power consumption information and the demand control information.

17 Claims, 17 Drawing Sheets

(56) References Cited

FOREIGN PATENT DOCUMENTS

| | | | |
|---|---|---|---|
| JP | 9-73577 | * | 3/1997 |
| JP | 11-313441 | * | 11/1999 |
| JP | 2000-132738 | * | 5/2000 |
| JP | 2002-24917 | | 1/2002 |
| JP | 2002-135976 | * | 5/2002 |
| JP | 2004-310421 | * | 11/2004 |
| JP | 2012-115003 | | 6/2012 |
| JP | 2013-65141 | | 4/2013 |
| JP | 2013-252033 | | 12/2013 |

* cited by examiner

FIG. 10

| LOAD DEVICE | PRIORITY ORDER |
|---|---|
| COOLING DEVICE | 2 |
| HEATING DEVICE | 1 |
| ILLUMINATION DEVICE | 3 |
| ⋮ | ⋮ |

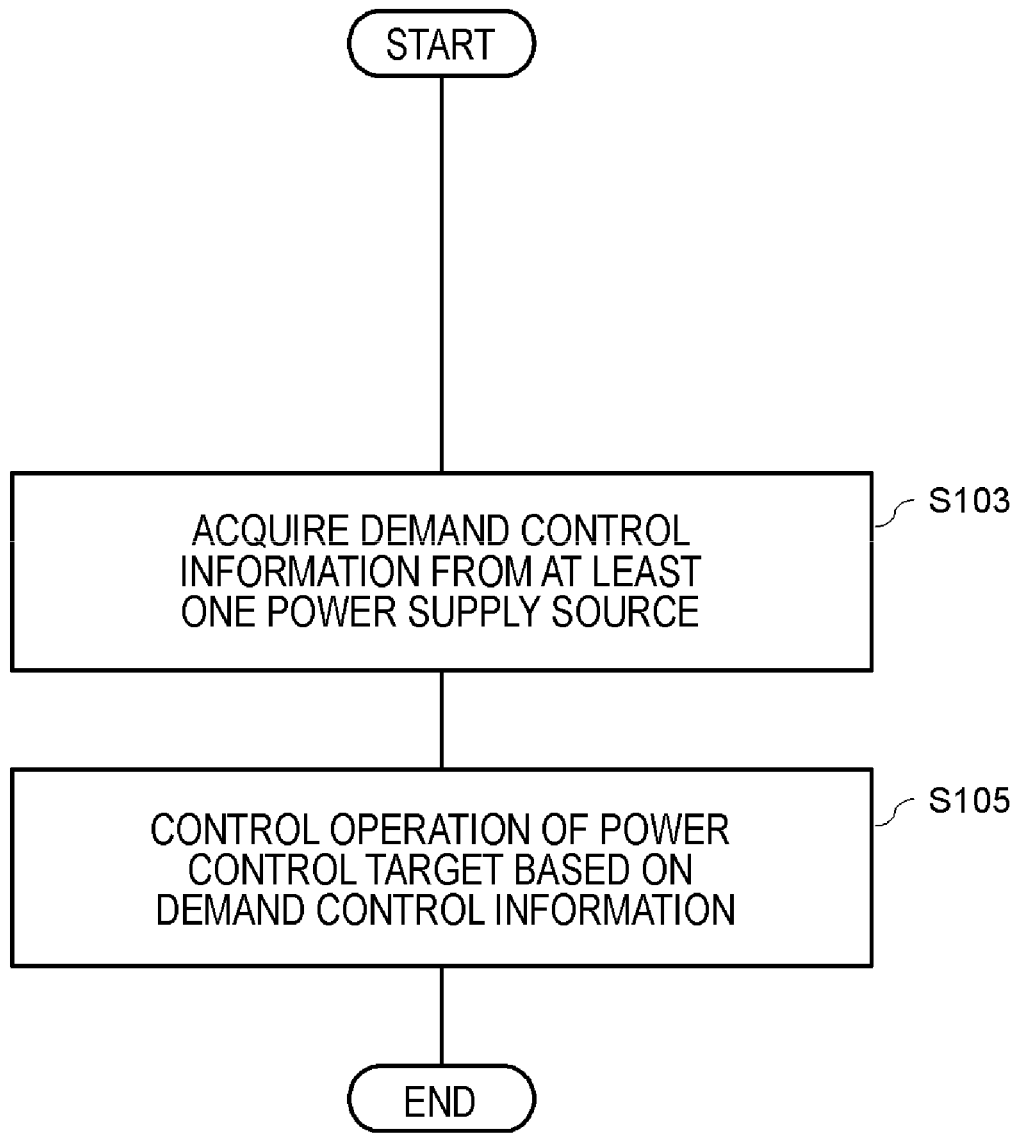

CONTROL DEVICE, CONTROL METHOD, AND PROGRAM

CROSS-REFERENCE TO RELATED APPLICATIONS

This application is a national phase application of International Application No. PCT/JP2015/062698, filed Apr. 27, 2015, and claims the priority of Japanese Application No. 2014-103116, filed May 19, 2014, the content of both of which is incorporated herein by reference.

TECHNICAL FIELD

The present invention relates to a control device, a control method, and a program, and in particular, to a control device which controls an operation of a power control target, a control method, and a program.

BACKGROUND ART

An example of a control device which controls the operation of a storage battery or a heat accumulator is described in Patent Document 1. A control device of Patent Document 1 determines an operation schedule of a storage battery or a heat accumulator provided in a smart house based on reference information. Patent Document 1 describes use of time-of-use (TOU) pricing information, power generation information of a power generator, power consumption information of a load device, or the like as the reference information.

In the control device described in Patent Document 1, electric power or heat in the storage battery or the heat accumulator is stored during low power consumption of the load device in the smart house or when the electricity price is low, and electric power is discharged from the storage battery during high power consumption of the load device, thus allowing efficient use of electric power.

Methods for saving power in a vending machine are described in respective documents. For example, when a vending machine of Patent Document 2 performs peak shaving operation based on time periods and time bands performed such as when a predetermined upper limit temperature is reached inside a refrigerator, unless a predetermined condition for cancelling the peak shaving operation is satisfied, operation of a refrigerator temperature adjustment unit is stopped in order to reduce power consumption.

A vending machine of Patent Document 3 reduces power consumption by switching between a power saving mode and a normal mode according to whether or not the sales of commodities in the vending machine have reached a target value.

A vending machine of Patent Document 4 minimizes consumption of power supplied from a commercial power supply by: charging power in a power storage device using nighttime power to which a low late-night electricity price applies; temporarily stopping the operation of a load device (cooling unit or the like) during a peak load in a daytime band; and using power stored in the power storage device.

A vending machine of Patent Document 5 performs power saving by controlling the setting temperature or the operation of a cooling device in response to a peak shifting or peak shaving instruction from a center device.

Patent Document 6 describes a vending machine for cooling or heating the interior of a heat-insulated commodity storage compartment while setting a hot or cold air blowing region in the compartment to the entire region of the compartment during a late-night time band to which a low electric rate applies as determined by an agreement with a power company. At this time, cold heat or hot heat is stored by using contents and containers of beverages in the commodity compartment as a heat storage material using a compartment internal circulation blower fan. In time bands other than the late-night time band, the air blowing region is switched to a partial region, and thermo-operation control of a cooling or heating device is performed. Accordingly, power saving is achieved by suppressing power consumption in a daytime time band, and operation maintenance costs are saved by efficiently using a cheaper late-night electricity price system.

RELATED DOCUMENT

Patent Document

[Patent Document 1] Japanese Unexamined Patent Application Publication No. 2012-115003
[Patent Document 2] Japanese Unexamined Patent Application Publication No. 2013-65141
[Patent Document 3] Japanese Unexamined Patent Application Publication No. 2002-24917
[Patent Document 4] Japanese Unexamined Patent Application Publication No. 2000-132738
[Patent Document 5] Japanese Unexamined Patent Application Publication No. H08-161623
[Patent Document 6] Japanese Unexamined Patent Application Publication No. H05-114077

SUMMARY OF THE INVENTION

Problem to be Solved by the Invention

In order to achieve energy saving or a low-carbon society, or in order to suppress a power demand when there is a sharp decrease in the amount of generated power or a sharp increase in fuel costs due to weather, disasters, accidents, or the like, a system is being studied in which a request for reduction in the amount of power usage is made from a power supply source to a consumer according to the situation of power supply and demand.

However, the documents described above do not describe any concept of dynamically controlling power consumption by controlling operation of a storage battery or a power generator or by controlling operation of a load device in a smart house accordingly based on a request from a power supply source. That is, in the techniques described in the above documents, since a request from a power supply source is not efficiently used, there is a problem in that it is not possible to dynamically and appropriately control power consumption according to the situation of power supply and demand.

The invention has been accomplished in consideration of the above-described situation, and an object of the invention is to provide a control device capable of dynamically and appropriately controlling power consumption according to the situation of power supply and demand, a control method, and a program.

A control device of the invention includes a communication unit which receives power consumption information of a power control target from an electric energy, an acquisition unit which acquires demand control information from at least one power supply source, and a control unit which controls the operation of the power control target based on the power consumption information and the demand control information.

There is provided a control method of a control device of the invention, the method performed by the control device, including receiving power consumption information of a power control target from an electric energy meter, acquiring demand control information from at least one power supply source, and controlling the operation of the power control target based on the power consumption information and the demand control information.

A computer program of the invention causes a computer to execute a procedure to receive power consumption information of a power control target from an electric energy meter, a procedure to acquire demand control information from at least one power supply source, and a procedure to control the operation of the power control target based on the power consumption information and the demand control information.

Any combination of the above constituent elements, or a method, a device, a system, a recording medium, and a computer program each of which changeably represents the invention in other forms are also effective as exemplary embodiments of the invention.

Various constituent elements of the invention are not necessarily individual independent entities, and may be anything in which a plurality of constituent elements are formed as one member, anything in which one constituent element is formed as a plurality of members, anything in which certain constituent elements are formed as a part of other constituent elements, anything in which a part of certain constituent elements and a part of other constituent elements are duplicated, or the like.

In the control method and the computer program of the invention, a plurality of procedures are described in order, but the described order is not intended to limit the order of performing the plurality of procedures. Accordingly, when the control method and the computer program of the invention are performed, the order of the plurality of procedures may be changed in a range which does not interfere with the content.

The plurality of procedures in the control method and the computer program of the invention are not limited to being executed at different timings, respectively. For this reason, other procedures may be executed during the execution of a certain procedure, and all or a part of the execution timings of a certain procedure and other procedures may overlap or the like.

Advantageous Effects of Invention

According to the invention, a control device capable of dynamically and appropriately controlling power consumption according to the situation of power supply and demand, a control method, and a program are provided.

BRIEF DESCRIPTION OF THE DRAWINGS

The above and other objects, features, and advantages will be more apparent from preferred exemplary embodiments described below and the following accompanying drawings.

FIG. 10 is a diagram showing an example of a structure of a table indicating the order of priority which is used by the control device according to the exemplary embodiment of the invention.

FIG. 17 is a flowchart showing an example of the operation of the control device of this exemplary embodiment.

DESCRIPTION OF EXEMPLARY EMBODIMENTS

Figure 1:
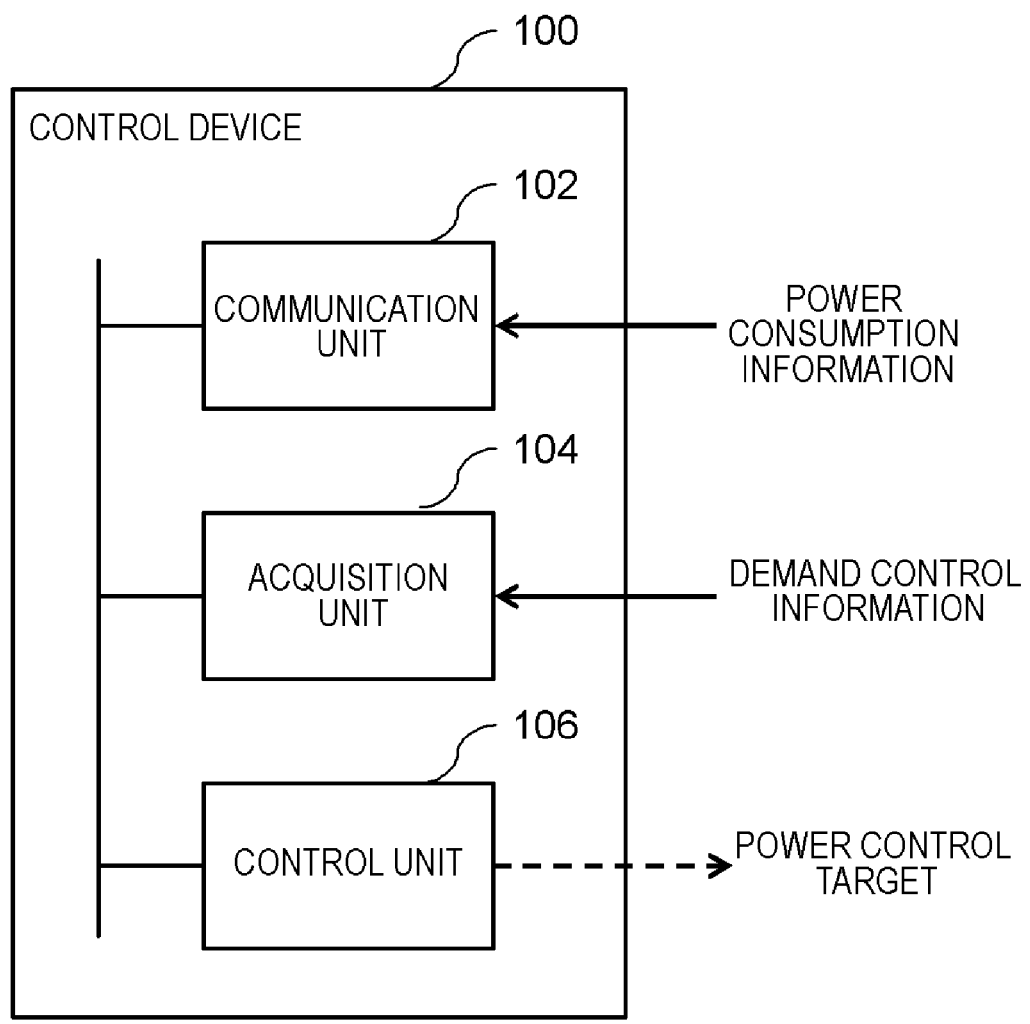
FIG. 1 is a functional block diagram showing a logical configuration of a control device according to an exemplary embodiment of the invention.

Hereinafter, exemplary embodiments of the invention will be described referring to the drawings. In all drawings, the same reference numerals are given to the same constituent elements, and description thereof will not be repeated.
(First Exemplary Embodiment)

FIG. 1 is a functional block diagram showing a logical configuration of a control device 100 according to an exemplary embodiment of the invention.

The control device 100 according to the exemplary embodiment of the invention includes a communication unit 102 which receives power consumption information of a power control target from an electric energy meter, an acquisition unit 104 which acquires demand control information from at least one power supply source, and a control unit 106 which controls the operation of the power control target based on the power consumption information and the demand control information.

The communication unit 102 receives the power consumption information of the power control target from the electric energy meter.

In the invention, the power control target refers to all devices in which consumed power may be measured by an electric energy meter. For example, the power control target includes at least one of a load device which consumes power, a storage battery which stores and discharges power that may be consumed by the load device, and a power generator which generates power that may be consumed by the load device and supplies power to the load device or stores power in the storage battery.

Examples of the power control target include a vending machine, an automated teller machine (ATM), an ID photo booth, a photograph printer, a game machine such as the so-called PURIKURA (Registered Trademark) photo booth (PURINTO KURABU (Registered Trademark)), a gate of a warehouse, a parking system, or a theme park, an automatic coin changer, a public telephone booth, park lighting, a street light, and the like.

The power control target may be a smart house or the like. However, as in the above-described example, electricity which is supplied to the power control targets that are mainly installed outdoors is preferably not distributed with power by an indoor wiring but directly receives power individually at the site and individually metered by an electric energy meter installed nearby.

The reason is that, for example, even when a request for reduction in the power usage amount is received by a private house from a power company, it is difficult to uniformly control power consumptions at home unless in a situation where power is forcibly interrupted, and in addition, handling each power consumption target separately is complicated and is not realistic. In addition, since determination on whether or not to perform power saving when the request is received is left to the determination of the individual, not much effect could be expected.

A plurality of power control targets, such as vending machines or ATMs, may be distributed in a certain area. The power control targets may be managed and controlled by a predetermined management organization or the like, and an agreement for the electricity prices and payment thereof may be managed collectively. When the power control target is managed by a company or an organization such as the case for a vending machine or the like, the method of controlling a load device or the like in the vending machine may be determined according to conditions or policies predetermined by a management source in response to a request for reduction in the usage amount or the like from the power supply source, and the method may be applied to each device. For this reason, it is possible to more efficiently and appropriately control power consumption. In addition, operation control is preferably performed for a plurality of power control targets according to the conditions or policies determined by the management source in view of an increasing possibility of obtaining a higher power saving effect is obtained.

The electric energy meter is a device capable of measuring the power consumption of a power control target and transmitting the measurement result to the control device 100. The so-called "smart meter" is one example of such a device.

The power consumption information is information including: at least one of an instantaneous power value and an integrated power value over a predetermined period of time (for example, for 30 minutes) measured by the electric energy meter; and time information of each value. In addition, the power consumption information may include a reverse power flow value of surplus power of a power generator or the like and time information of the reverse power flow value.

The acquisition unit 104 acquires the demand control information from at least one power supply source.

In this specification, the term "acquisition" includes at least one of: actively acquiring, by the own device, data or information stored in another device or a storage medium (active acquisition), for example, reception of the data or information through a request or an inquiry to another or other devices or reading the data or information through an access to another or other devices or a storage medium; and inputting data or information in the own device, the data or information outputted from another or other devices (passive acquisition), for example, reception of distributed (transmitted, push-notified, or the like) data or information. The term "acquisition" also includes selective acquisition from among pieces of received data or information, or selective reception of distributed data or information.

The power supply source may indicate at least one of a power company as an electric power supplier, a so-called "aggregator" which adjusts power from a plurality of power companies and supplies the power to consumers, a power producer, and a system operation organization, and may be, but not limited to, a system having a mechanism for supplying power to consumers.

In the invention, the demand control information is information for controlling a power demand presented to a side consuming power from the power supply source.

The demand control information, for example, includes at least one of: information on an electricity price (price for each time band classification, restrictions to the use time or the use amount, or the like) agreed upon with the power supply source 60 in advance; and piece of information, transmitted from the power supply source 60, out of information relating to a fuel cost adjustment amount, information relating to power interruption or planned power interruption (time, area, scheduled recovery time, or the like), and a so-called "demand response" described below.

Demand response is defined by Assessment of Demand Response & Advanced Metering, FERC (Federal Energy Regulatory Commission) (2011) as described below in the U.S.A. Demand response is defined as "changes in electric usage by demand-side resources from their normal consumption patterns in response to changes in the price of electricity over time, or to incentive payments designed to induce lower electricity use at times of high wholesale market prices or when system reliability is jeopardized".

Demand response is being studied also in Japan. Referring to the definition in the U.S., as illustrated below, since demand response is currently in a study stage in Japan, the invention is not limited thereto, and follows any decisions made in the future.

(a) Information based on Price of Electricity

This is information for prompting a consumer to change in demands through the consumer's own judgement. This is achieved by an electric supplier, as a power supply source, setting and notifying prices of electricity for each time band (or time). For example, demand can be suppressed by setting a relatively high price at the time of a high load, and demand may be prompted by setting a relatively low price at the time of a low load.

(a1) Time-Of-Use (TOU) (seasonal) pricing information (a2) Critical Peak Pricing (CPP) information This is information of a price to which a high unit price applies at the time of a specific condition (at an emergency or at the time of a sharp increase in wholesale market price) separate from a normal time.

(a3) Peak Day Pricing (PPP) information (a4) Real Time Pricing (RTP) information This is information of a price reflecting the wholesale market price determined for each time period.

(b) Information based on an incentive in a demand adjustment agreement or the like This is information relating to a request or execution of load suppression or shut-off when a wholesale power price rate increases sharply or power supply with respect to the demand is restricted, agreed upon between a power supply source and a consumer in advance. For example, an applicable time period, a time band, conditions, or the like are included in the information.

(b1) Reward for reduction in load (b2) Supply and demand adjustment agreement (b3) Direct load control For example, the power supply source may give notification in advance to shut off a target load device by a remote operation.

(b4) Power wholesale market (capacity market, emergency adjustment market)

The control unit 106 controls the operation of the power control target based on the power consumption information and the demand control information.

The control of the operation of the power control target includes various kinds of control for the purpose of controlling power consumption in the power control target. As an example, control of power supply to the power control target (stopping of power supply from the power supply source, switching to power supply from the storage battery or the power generator, or the like), operation control of start and stop of the power control target, control of an operation mode (changing the temperature setting, switching modes, or the like) of the power control target, or the like is included.

In the invention, the power control target has at least one function (load device or the like) for consuming power. The control unit 106 controls the operations of various functions of the power control target, whereby it is possible to control the power consumption of the target. Various functions of the power control target are realized by cooperation of hardware of each device and software of each program operating each device.

The control device of the invention may be incorporated in the power control target, or may be installed outside the power control target. In a case where the power control target has a plurality of elements (for example, the target is a warehouse), a plurality of elements of air conditioning, a security camera, a gate, a solar cell, and the like of the warehouse may be controlled by at least one control device. In a case where a plurality of vending machines are installed adjacent to one another, a plurality of vending machines may be controlled using at least one control device.

<System Configuration Example>

Hereinafter, as an exemplary embodiment of the invention, an example where a control device of the invention is applied to a system which manages vending machines will be described.

Figure 2:
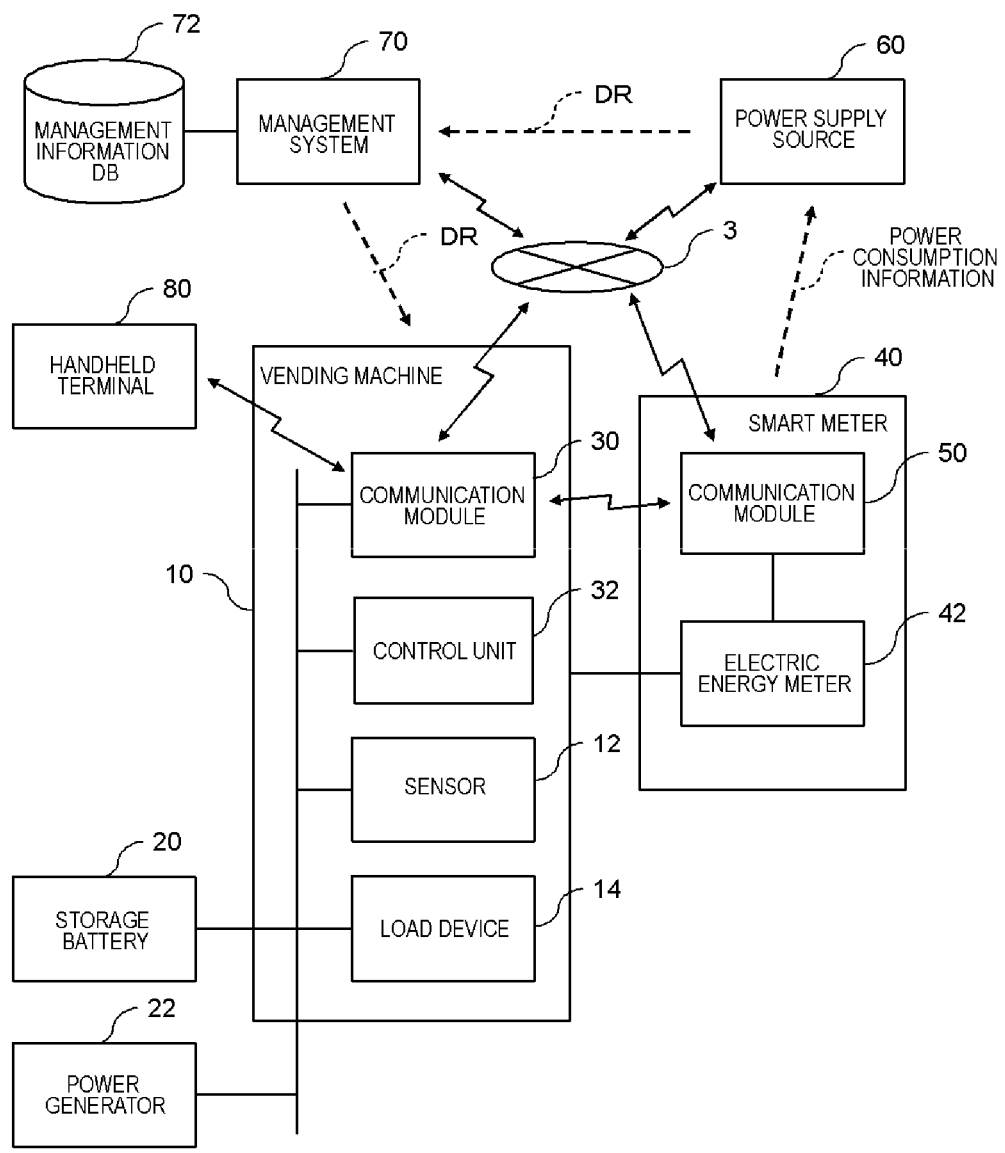
FIG. 2 is a block diagram showing a configuration example of a system which controls power of a vending machine using the control device according to the exemplary embodiment of the invention.

FIG. 2 is a block diagram showing a configuration example of a system which controls power of the vending machines 10 using the control device 100 according to the exemplary embodiment of the invention.

In the system of FIG. 2, a management system 70 manages a plurality of vending machines 10 (in FIG. 2, only one vending machine is shown). A management information database 72 stores information related to the vending machines 10. The management system 70 acquires demand control information, such as a demand response (DR) from the power supply source 60 and transmits the demand control information to the plurality of vending machines 10 to be managed. A smart meter 40 having a metering function is provided in each vending machine 10, and power consumption information of the vending machine 10 metered by the smart meter 40 is transmitted from the smart meter 40 to the power supply source 60.

The vending machine 10, as a power control target, includes a load device 14 serving as a control target of power consumption, a sensor 12 which detects various states in the vending machine 10, and a control unit 32 which controls the operation of the vending machine 10.

As described below, the vending machine 10 of this exemplary embodiment further includes a communication module 30, the communication module 30 corresponding to the control device 100 of FIG. 1.

The vending machine 10 may be connected to at least one of a storage battery 20 which supplies power to the vending machine 10 and a power generator 22, such as a solar power generator.

The management system 70 or the power supply source 60 may include a server computer or a personal computer including a CPU, a memory, a hard disk, and a communication device (not shown), or a device corresponding to these computers.

In the respective drawings of this specification, the configuration of units not relevant to the essence of the invention will not be repeated, and for example, a commodity vending mechanism of the vending machine 10 is not shown.

The management system 70 may have various functions of managing the vending machines 10. In the invention, the management system 70 uses at least a function of transferring the demand control information received from the power supply source 60 to a plurality of vending machines 10. The control of the vending machines 10 according to the invention is not based on an instruction from the management system 70, but is primarily based on an instruction from the control device 100 of the invention.

An electric energy meter of the invention measures the amount of power which is supplied from the power supply source 60 to the power control target described above and consumed by the target. As shown in FIG. 2, in this exemplary embodiment, description will be provided in connection with an example where an electric energy meter 42 is included in the so-called "smart meter 40".

In this exemplary embodiment, the electric energy meter 42 stores an instantaneous power value, an integrated power value over a predetermined period (for example, 30 minutes), and a current value as power consumption information along with time information of these values. Information measured by the electric energy meter 42 may include information of a reverse power flow value of surplus power of the power generator 22 or the like. In addition, the electric energy meter 42 (or the control device 100) may store these kinds of information and may store history information over a predetermined period.

The communication unit 102 (FIG. 1) receives various kinds of information described above from the electric energy meter 42 as power consumption information.

The vending machine 10 and the smart meter 40 respectively include a communication module 30 and a communication module 50, and may perform communication with each other. In this exemplary embodiment, the communication module 30 and the communication module 50 may perform wireless communication with each other by a specific low power wireless system using the 920 MHz band. For example, a wireless smart utility network (Wi-SUN) may be employed. The Wi-SUN has features of low power consumption, a long range, and a reduced occurrence of radio wave interference with another radio wave device, compared to a wireless local area network (LAN) (so-called wireless fidelity (Wi-Fi)). Since Wi-SUN has superior wraparound characteristics, it is possible to secure stable communication even in places where there is a wall or an obstacle. A 920 MHz band system is preferable in that the communication rate is faster (a maximum of about 200 kbps) than other specific low power wireless systems (400 MHz band).

As described below, in this exemplary embodiment, each communication module may further include, in addition to the communication unit that performs specific low power wireless communication using the 920 MHz band, a communication unit which is connected to a network 3 through a base station (not shown) to perform communication with the management system 70 or the power supply source 60. The network 3 is a mobile phone communication network using a mobile phone communication system, such as 3rd generation (3G) or long term evolution (LTE).

In the vending machine 10, while the communication module 30 may have a function of performing communication with a handheld terminal 80 for performing inventory management of commodities in the vending machine 10, this function is not relevant to the essence of the invention, and thus detailed description thereof will not be provided.

In this exemplary embodiment, the communication module 30 of the vending machine 10 corresponds to the control device 100 of FIG. 1.

The communication module 50 of the smart meter 40 performs communication with the communication module 30 of the vending machine 10 by a 920 MHz band system, and performs communication with the power supply source 60 through the network 3 by a mobile phone communication system, such as 3G.

The smart meter 40 may have the following functions but is not limited thereto.
(c1) a function of metering power supplied to the power control target by the electric energy meter 42 and transmitting the metering data to the power supply source at regular intervals (every 30 minutes)
(c2) a function of exchanging information with the power supply source 60
(c3) a function of controlling power supply of the load device 14 as a power control target
(c4) a function of acquiring an electricity price (a feedback value from a power company or a conversion value inside the smart meter 40) or an amount of electricity usage (a use history by time band) and presenting the electricity price to the consumer In this exemplary embodiment, the power supply source 60 is a power company that is an electric power supplier.

Figure 3:
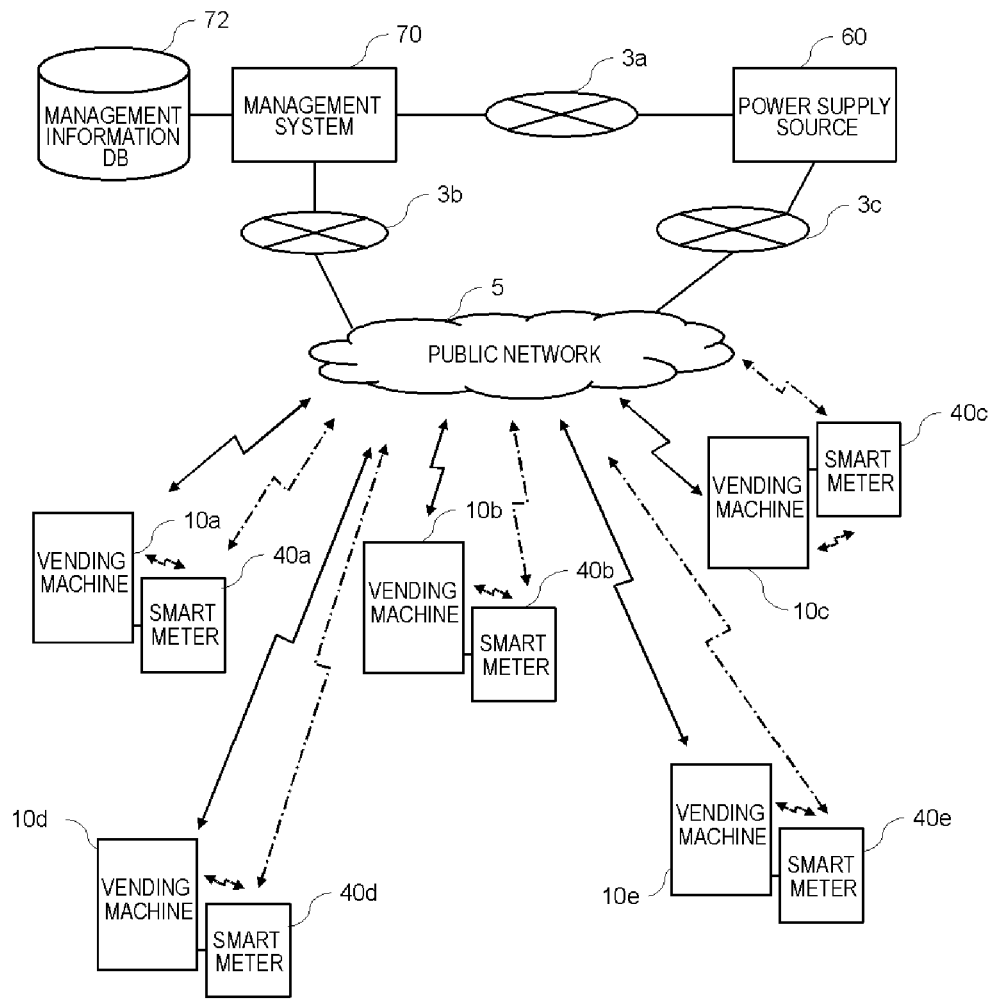
FIG. 3 is a diagram showing an example of a network configuration in a vending machine management system using the control device according to the exemplary embodiment of the invention.

FIG. 3 is a diagram showing an example of a network configuration in the vending machine management system using the control device according to the exemplary embodiment of the invention.

In FIG. 3, the management system 70 manages a plurality of vending machines 10a to 10e (hereinafter, in a case where there is no need for particular distinction, simply referred to as "vending machines 10"). In the respective drawings of this specification, the number of vending machines 10 is not limited to the number of vending machines shown in the drawings. The management system 70 performs communication with a plurality of vending machines 10a to 10e through a network 3b by way of a public network 5 and acquires information from the vending machines 10a to 10e or gives the vending machines 10 an instruction.

A plurality of vending machines 10a to 10e are respectively connected to a plurality of smart meters 40a to 40e (hereinafter, in a case where there is no need for particular distinction, simply referred to as "smart meters 40"). In this exemplary embodiment, although one smart meter 40 is provided for each vending machine 10, the invention is not limited thereto. For example, one smart meter 40 may measure the amounts of power of a plurality of vending machines 10. In this case, one smart meter 40 may manage power consumption information of a plurality of vending machines 10 in a batch or individually.

In this exemplary embodiment, the management system 70 and the power supply source 60 perform communication through a network 3a including at least one of a local area network (LAN), a wide area network (WAN), the Internet, and a virtual private network (VPN).

The management system 70 and each vending machine 10 perform communication through a network 3b including at least one of a LAN, a WAN, the Internet, and a VPN, by way of the public network 5 connectable byway of a base station (not shown) by a mobile phone communication system, such as 3G.

The power supply source 60 and each smart meter 40 perform communication through a network 3c including at least one of a LAN, a WAN, the Internet, and a VPN by way of the public network 5 connectable by a mobile phone communication system, such as 3G.

Though not shown, the management system 70 and the power supply source 60 may be connected to the network 3a by way of the public network 5 to perform communication.

A plurality of smart meters 40a to 40e may perform communication with one another by a specific low power wireless system using the 920 MHz band as described above.

As a communication system which is employed in the smart meter 40, the following communication systems are currently being studied, but the smart meter 40 of the invention may employ various communication systems applicable in the future as appropriate and is not limited to the following communication systems. In this exemplary embodiment, the following communication systems may be applied to communication between the power supply source 60 and each smart meter 40 and communication among a plurality of smart meters 40.
(d1) 1:N wireless communication system
This is a communication system used in this exemplary embodiment in which communication is performed using a mobile phone communication system, such as 3G or LTE. Since communication is performed with a base station (not shown) with comparatively high output, the communication range is long, and the communication stability is satisfactory. For example, a preferable area for application may be a mountainous area where buildings are scattered.

(d2) Wireless multi-hop communication

Communication is performed with an adjacent node (smart meter 40) using radio with comparatively low output to transmit (transfer) data, and data is collected by a concentrator (not shown) to be a gateway to a center (not shown) side. For example, application in a general residential area is preferable. This configuration will be described in connection with examples described below.

(d3) Power line communication (PLC) system

Communication is performed using a power line as a communication medium. For example, application in a crowded area of high-rise structures is preferable.

Hereinafter, information (demand control information, power consumption information) which is exchanged between the respective devices will be described.

(e) Demand control information

In the invention, demand control information sent from the power supply source 60 is transmitted to the vending machine(s) 10 as power control target(s) by way of at least one of the following paths.

(e1) The demand control information is transmitted from the power supply source 60 to the management system 70 through the network 3a, and is further transferred from the management system 70 to a plurality of power control targets (for example, the vending machines 10a to 10e) through the network 3b connected by way of the public network 5.

(e2) The demand control information is transmitted from the power supply source 60 to the smart meters 40a to 40e through the network 3c connected by way of the public network 5, and is further transmitted from the smart meters 40a to 40e to the power control targets (for example, the vending machines 10a to 10e) by a specific low power wireless system using the 920 MHz band.

(e3) The demand control information is directly transmitted from the power supply source 60 to each power control target (for example, the vending machines 10) through the network 3c (or other dedicated networks).

In (e2) or (e3) described above, a predetermined smart meter 40 (for example, the smart meter 40a) may representatively receive the demand control information from the power supply source 60, transfer the received demand control information to other smart meters 40, and propagate the demand control information among other smart meters 40 (for example, the smart meters 40b to 40e).

In regard to the timings of transmitting and receiving the demand control information, for example, information may be transmitted from the power supply source 60 to the consumer side spontaneously, at regular intervals, or as needed at a predetermined time or at an emergency. Alternatively, information may be transmitted to the power supply source 60 at regular intervals, at a predetermined time, at the time of an arbitrary inquiry from the consumer side, after a predetermined time elapsed from previous information transmission/reception, before and after power control processing in the control device 100, or the like in response to a request from the management system 70, the smart meter 40, or the vending machine 10, but the invention is not limited thereto.

(f) Power consumption information

In the invention, the power consumption information is metered and integrated, stored, and transmitted by the smart meter 40 to the power supply source 60 or the management system 70 by way of at least one of the following paths.

(f1) The power consumption information is transmitted from each smart meter 40 to the power supply source 60 through the network 3c connected by way of the public network 5.

(f2) The power consumption information is transmitted from a plurality of smart meters 40a to 40e to a plurality of vending machines 10a to 10e, respectively, by a specific low power wireless system using the 920 MHz band.

(f3) The power consumption information is transmitted from each vending machine 10 to the management system 70 through the network 3b connected by way of the public network 5.

In regard to the timing of transmitting and receiving the power consumption information, information may be sent from each smart meter 40 to the power supply source 60 or the consumer side spontaneously, at regular intervals (for example, every 30 minutes), at a predetermined time, or arbitrarily. Alternatively, information may be transmitted to the smart meter 40 at regular intervals, at a predetermined time, at the time of an arbitrary inquiry, after a predetermined time elapsed from previous information transmission/reception, before and after power control processing in the control device 100, or the like in response to a request from the management system 70, the power supply source 60, or the vending machine 10, but the invention is not limited thereto.

<Communication Module>

Next, the communication module (the communication module 30 or the communication module 50 of FIG. 2) of the invention will be described below.

Figure 4:
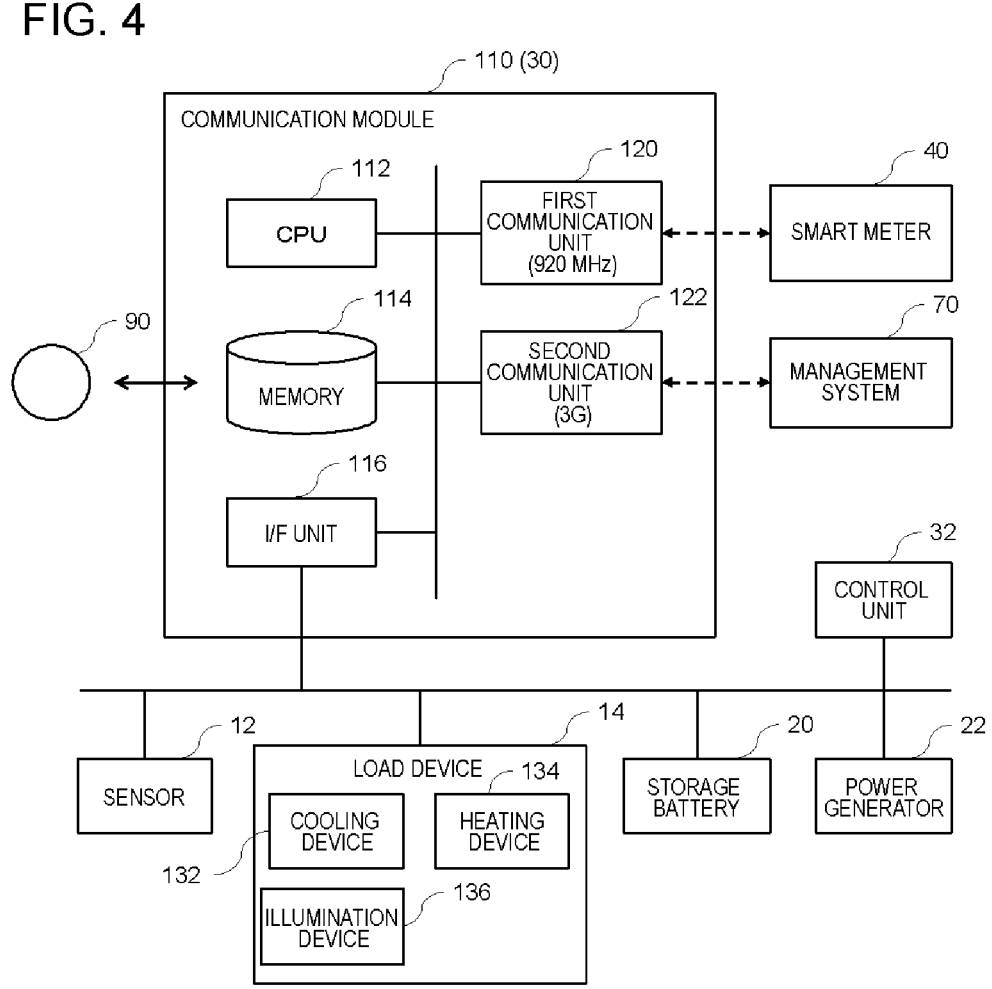
FIG. 4 is a block diagram showing a configuration of a communication module which is mounted in a vending machine as a power control target according to the exemplary embodiment of the invention.

FIG. 4 is a block diagram showing the configuration of a communication module 110 which is mounted in the vending machine 10 as a power control target according to the exemplary embodiment of the invention.

The communication module 110 includes a central processing unit (CPU) 112, a memory 114, an interface (I/F) unit 116, a first communication unit 120, and a second communication unit 122.

The communication module 110 of FIG. 4 corresponds to the control device 100 of FIG. 1 and the communication module 30 of FIG. 2.

Each of the constituent elements of the control device 100 of FIG. 1 is realized by an arbitrary combination (so-called "firmware") of hardware and software of an arbitrary computer including the CPU 112, the memory 114, a program 90 which is loaded on the memory 114 and realizes the constituent elements of FIG. 1, a storage unit (not shown) which stores the program 90, such as a read only memory (ROM) or a flash memory, and the I/F unit 116 (alternatively, the first communication unit 120 or the second communication unit 122) shown in FIG. 4. Those skilled in the art will understand that there may be various modification examples to the method of realization thereof and the device. Each of the block diagrams described in this specification shows a block of a logical functional unit rather than the configuration of a hardware unit.

In the communication module 110 (control device 100) of this exemplary embodiment, various units shown in FIG. 1 are realized as various functions by the CPU 112 executing various processing operations corresponding to the computer program 90.

The computer program 90 of this exemplary embodiment is described such that a computer for realizing the communication module 110 (control device 100) executes a procedure to receive the power consumption information of the power control target (vending machine 10) from the electric energy meter 42, a procedure to acquire the demand control information from at least one power supply source 60, and a procedure to control the operation of the power control target (vending machine 10) based on the power consumption information and the demand control information.

The computer program 90 of this exemplary embodiment may be recorded in a computer-readable recording medium. A recording medium is not particularly limited, and various forms of recording mediums may be considered. The program 90 may be loaded on the memory 114 of the computer from a recording medium, or may be downloaded to the computer through a network and loaded on the memory 114.

A recording medium for recording the computer program 90 includes a non-transitory computer-usable medium, and a computer-readable program code is embedded in the medium.

When the computer program 90 is executed on the computer, the computer executes a control method for achieving a control device.

In this exemplary embodiment, the I/F unit 116 has a structure allowing the communication module 110 to be incorporated in the vending machine 10, or a hardware structure allowing the communication module 110 to be detachably connected to the vending machine 10, and includes a connection portion for electrical connection. The CPU 112 of the communication module 110 is electrically connected to the control unit 32, the sensor 12, and the load device 14 of the vending machine 10, the storage battery 20, and the power generator 22 through the I/F unit 116.

The first communication unit 120 performs communication by a specific low power wireless system using the 920 MHz band. In this exemplary embodiment, the first communication unit 120 performs communication with the smart meter 40 or the handheld terminal 80 of FIG. 2.

The second communication unit 122 performs communication by a mobile phone communication system, such as 3G or LTE. In this exemplary embodiment, the second communication unit 122 performs communication with the management system 70.

In this exemplary embodiment, for example, the first communication unit 120 corresponds to the communication unit 102 of FIG. 1, and the second communication unit 122 corresponds to the acquisition unit 104 of FIG. 1. In other examples, the first communication unit 120 may correspond to both of the communication unit 102 and the acquisition unit 104 of FIG. 1.

The vending machine 10 has at least one of functions of cooling, heating, and heat insulating as a function of adjusting a temperature of a commodity to be sold. In FIG. 4, a cooling device 132 and a heating device 134 correspond to these functions. In addition, the vending machine 10 has a function of controlling at least one of lighting, a liquid crystal display, an LED display, and sound output. In FIG. 4, an illumination device 136 corresponds to this function.

In this exemplary embodiment, the control unit 106 (FIG. 1) individually or integrally controls the operation of the functions of the load device 14 that achieves each of these functions, whereby it is possible to control the power consumption relevant to the vending machine 10.

The control unit 106 (FIG. 1) controls the operation (charging/discharging or the like) of the storage battery 20 or the power generator 22 connected to the vending machine 10 or uses surplus power, whereby it is possible to further control the power consumption of the vending machine 10.

The control unit 106 (FIG. 1) may control the operation of a security camera (not shown) provided in parallel with the vending machine 10, whereby it is possible to further control the power consumption relevant to the vending machine 10.

As another example other than the vending machine 10, in a case where a power control target is a warehouse (not shown), the control unit 106 (FIG. 1) controls the operation of at least one of an air conditioner, lighting, an automatic door, a security camera, an authentication device, a solar cell, and the like as a function consuming power relevant to the warehouse, whereby it is possible to control the power consumption relevant to the warehouse.

If a power control target is a parking system (not shown), the control unit 106 (FIG. 1) may control the operation of at least one of a ticketing machine, lighting in a parking space, a driving device of a gate bar, a parking price adjustment machine, and the like as a function consuming power relevant to the parking system, thereby controlling the power consumption relevant to the parking system.

If a power control target is a gate (not shown) of a theme park, the control unit 106 (FIG. 1) controls the operation of at least one of a ticket gate, a face authentication device, lighting, and the like as a function consuming power relevant to the theme park, whereby it is possible to control the power consumption relevant to the gate of the theme park.

For these power control targets, the control unit 106 (FIG. 1) may further control the power consumption of the power control target by controlling the operation of the storage battery or the power generator capable of supplying power to the power control target or by using surplus power, instead of power supply from the power supply source.

<Smart Meter>

Next, the configuration of the smart meter 40 which measures the amount of power of the power control target in this exemplary embodiment will be described below.

Figure 5:
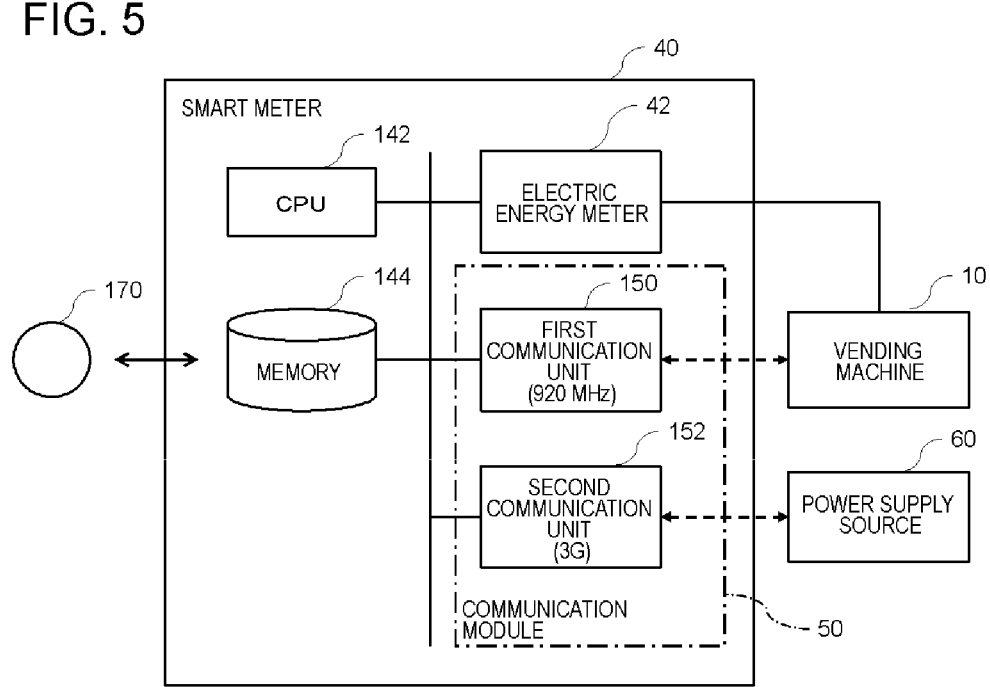
FIG. 5 is a functional block diagram showing the configuration of a smart meter according to the exemplary embodiment of the invention.

FIG. 5 is a functional block diagram showing the configuration of the smart meter 40 according to the exemplary embodiment of the invention.

The smart meter 40 includes an electric energy meter 42 which measures the amount of power of the vending machine 10, a CPU 142, a memory 144, a first communication unit 150, and a second communication unit 152.

The smart meter 40 is realized by an arbitrary combination (so-called "firmware") of hardware and software of an arbitrary computer including the CPU 142, the memory 144, a program 170 which is loaded on the memory 144 and realizes the function of the smart meter 40, a storage unit (not shown) which stores the program 170, such as a read only memory (ROM) or a flash memory, and the first communication unit 150 or the second communication unit 152. Those skilled in the art will understand that there may be various modification examples to the method of realization thereof and the device.

The first communication unit 150 performs wireless communication with the vending machine 10 by a specific low power wireless system using the 920 MHz band. The second communication unit 152 performs communication through the power supply source 60 and the network 3c by a mobile phone communication system, such as 3G or LTE. The communication module 50 of FIG. 2 may have a configuration including at least the first communication unit 150.

In this exemplary embodiment, the communication module 30 (the communication module 110 of FIG. 4) is mounted in the power control target (vending machine 10), and the communication module 50 (FIGS. 2 and 5) is mounted in the smart meter 40, thereby enabling communication between the power control target (vending machine 10) and the smart meter 40 and communication between the power control target (vending machine 10) and the management system 70 (or the power supply source 60). The control device 100 (FIG. 1) controls the operation of the power control target (vending machine 10) based on the demand control information acquired from the management system 70 and the power consumption information of the power control target (vending machine 10) acquired from the smart meter 40, thereby controlling the power consumption of the power control target.

A control method for the control device 100 according to the exemplary embodiment of the invention configured as above will be described below.

Figure 6:
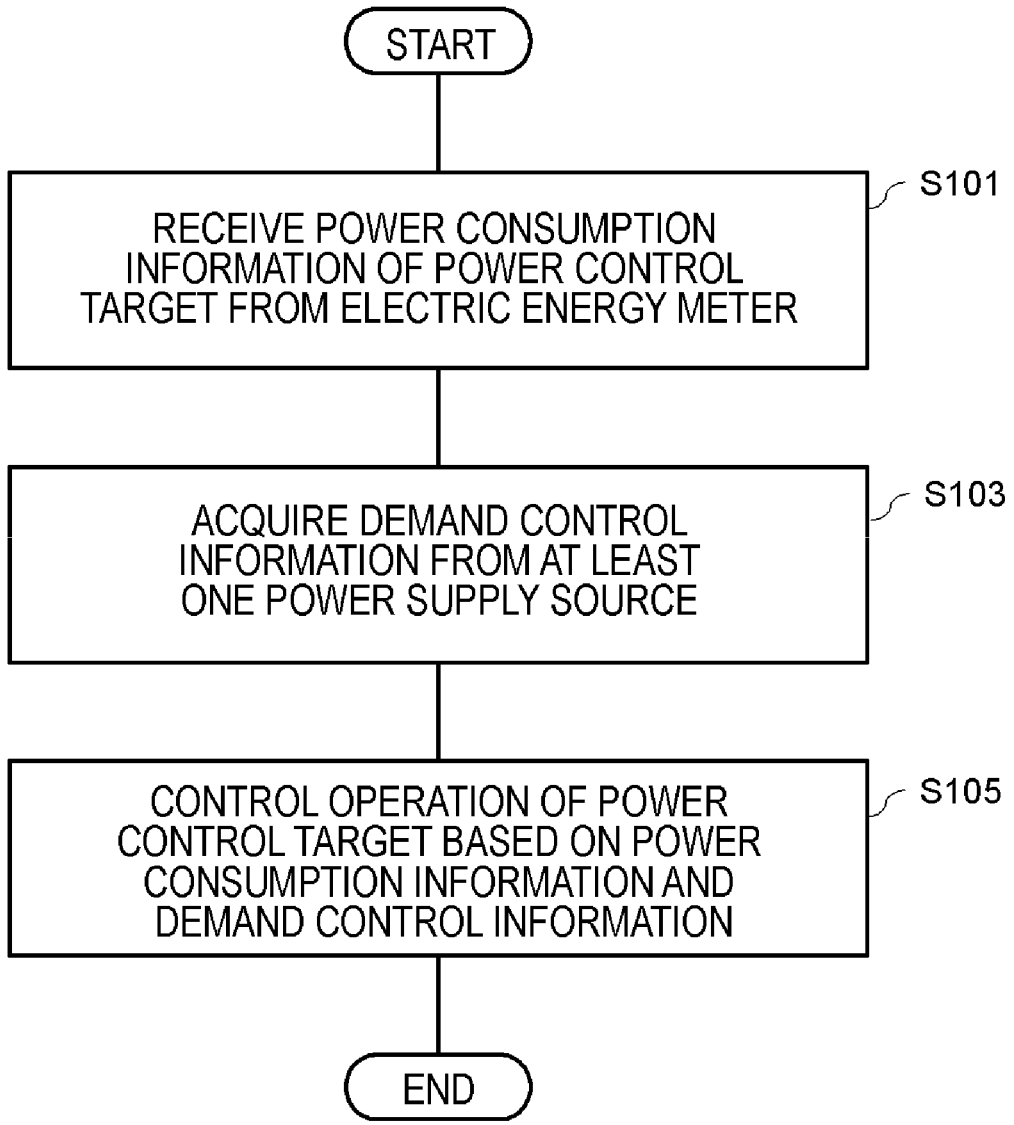
FIG. 6 is a flowchart showing an example of the operation of the control device according to the exemplary embodiment of the invention.

FIG. 6 is a flowchart showing an example of the operation of the control device 100 according to the exemplary embodiment of the invention.

The control method of this exemplary embodiment is configured such that the control device 100 receives the power consumption information of the power control target (vending machine 10) from the electric energy meter 42 (Step S101), acquires the demand control information from at least one power supply source 60 (Step S103), and controls the operation of the power control target (vending machine 10) based on the power consumption information and the demand control information (Step S105).

In detail, in the control device 100, the communication unit 102 (the first communication unit 120 of FIG. 4) receives the power consumption information of the vending machine 10 from the electric energy meter 42 of the smart meter 40 of FIG. 2 (Step S101). Then, the acquisition unit 104 (the second communication unit 122 of FIG. 4) acquires the demand control information from the power supply source 60 by way of the management system 70 (Step S103).

The control unit 106 controls the operation of the vending machine 10 based on the power consumption information and the demand control information (Step S105). For example, the control unit 106 controls the operation of at least one of the load device 14 of the vending machine 10, the storage battery 20, and the power generator 22. This control, for example, allows suppression in power consumption to satisfy the restriction demanded by the demand control information or allows reduction in the electricity price.

Hereinafter, the method of controlling the operation of the power control target by the control device 100 will be described in connection with a specific example.
<Control Method Example 1>

Figure 7:
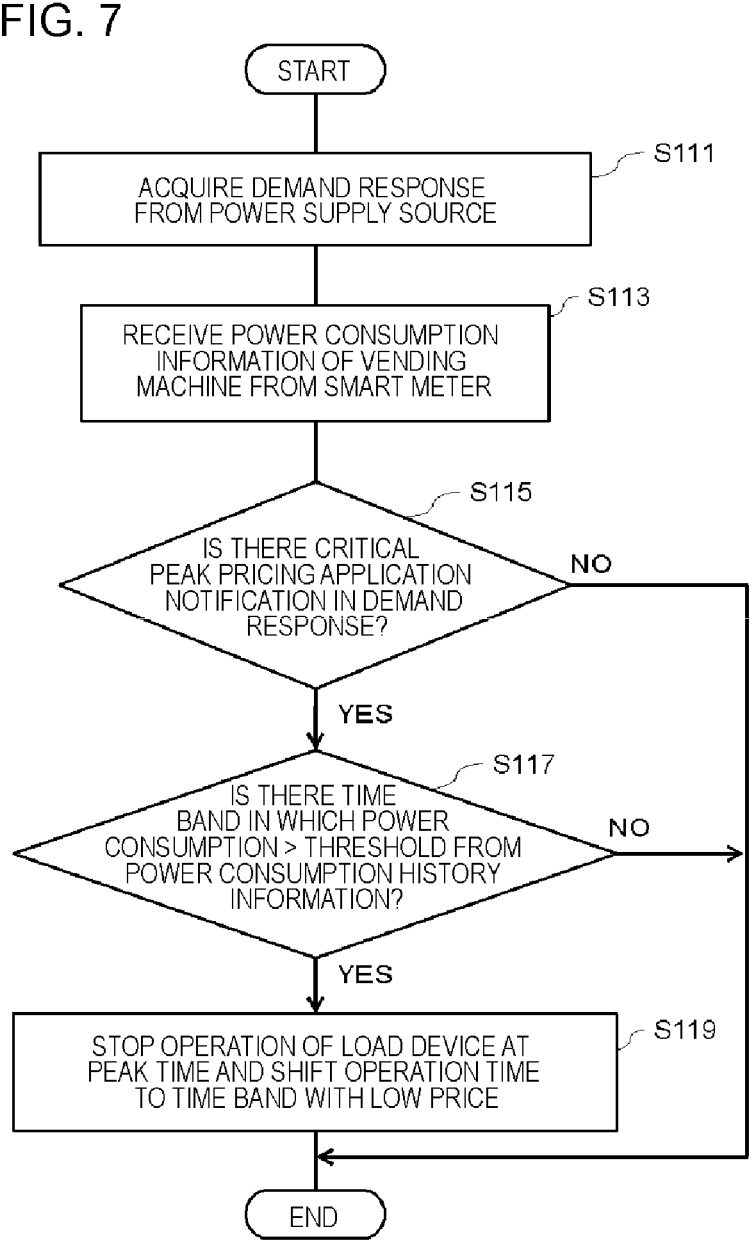
FIG. 7 is a flowchart showing an example of controlling the operation of the power control target by the control device according to the exemplary embodiment of the invention.

FIG. 7 is a flowchart showing an example of a control method of the operation of the power control target by the control device 100 according to the exemplary embodiment of the invention.

In this example, the peak of the power consumption of the vending machine 10 is shifted to a time band with a low electricity price based on a demand response indicating critical peak pricing application notification. At this time, the control unit 106 determines the amount of power to be shifted and a time band to which the power is to be shifted, as more appropriate, based on history information of the past power consumption.

First, when the demand response from the power supply source 60 is distributed to the management system 70, the demand response is transferred from the management system 70 to each vending machine 10. In each vending machine 10, the acquisition unit 104 (the second communication unit 122 of FIG. 4) receives and acquires, from the management system 70, the demand response from the power supply source 60 (Step S111). Step S111 corresponds to Step S103 of FIG. 6 described above. While it is assumed that Step S111 is performed at a predetermined timing as described above in regard to the transmission/reception timings of the demand control information, Step S111 may be performed when information is sent from the management system 70 to the vending machine 10 in an interruptive manner, or may be performed in the form of the vending machine 10 collecting the information from the management system 70 at regular intervals.

The communication unit 102 (the first communication unit 120 of FIG. 4) receives the power consumption information of the vending machine 10 from the smart meter 40 (Step S113). Step S113 corresponds to Step S101 of FIG. 6 described above. In regard to the reception timing of the power consumption information of Step S113, as described above, it is assumed that Step S113 is performed at a predetermined timing as described above, and in this exemplary embodiment, the control device 100 requests the smart meter 40 for information at regular intervals and receives information. In addition, in this exemplary embodiment, the control device 100 repeats Step S113 at regular intervals to store the power consumption information received from the smart meter 40 in the memory 114 as history information in association with date and time information. In another example, the control device 100 may receive the history information of the power consumption information stored in the smart meter 40 and store the history information of the power consumption information in the memory 114.

Figure 8:
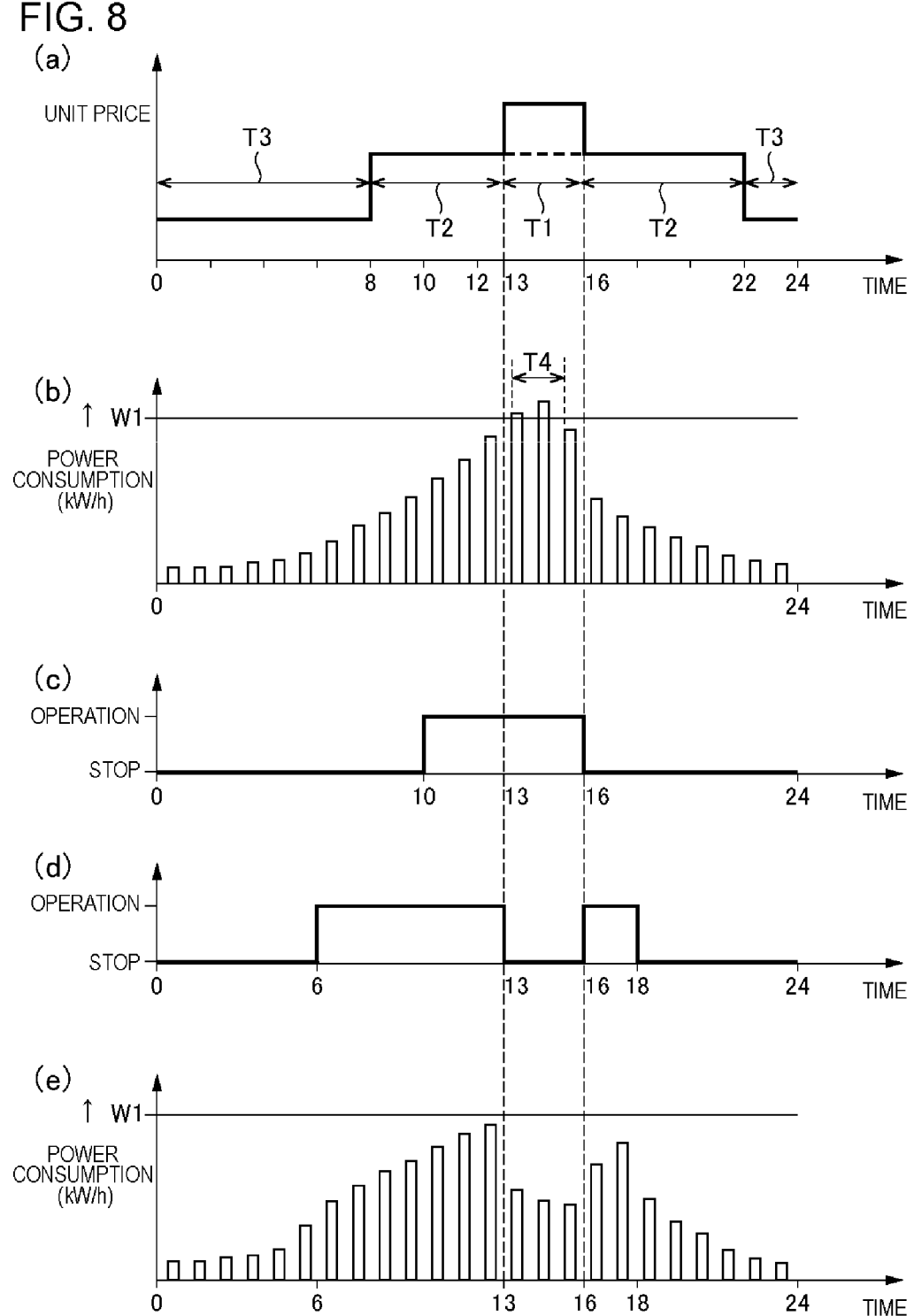
FIG. 8 is a diagram illustrating the operation of a power control target by the control device according to the exemplary embodiment of the invention.

Here, it is assumed that the demand response acquired in Step S111 includes the critical peak pricing application notification, for example, CPP information (YES in Step S115). The CPP information is assumed to show that, as shown in FIG. 8(a), a unit price of electricity at a peak time (period T1) will be changed to a unit price (indicated by a solid line) higher than that at a normal time indicated by a broken line from the following day.

The control unit 106 refers to the history information stored in the memory 114. For example, transition information of the power consumption for one day in the past (for example, a previous day or the same day of the week in the previous week) as shown in FIG. 8(b) is acquired.

The control unit 106 determines whether or not there is a time band in which the power consumption exceeds a threshold W1 from the history information (Step S117). In a case where there is a time band (a period T4 of FIG. 8(b)) in which the power consumption exceeds the threshold W1 (YES in Step S117), the control unit 106 determines to stop the operation of the load device 14 during the period T1 which includes the period T4 and which is a period with a high unit price (Step S119).

Specifically, the control unit 106 performs control such that the operation of the load device 14 of the vending machine 10 is stopped during the period T1 (or the period T4), and shifts the operation time to within T2 or T3 which is a time band with a lower price.

At this time, the control unit 106 determines the power consumption amount to be shifted, the load device 14 to be a control target, the stopped time period, the time or the length of the operation time after shifting, and the like based on information of both of the power consumption information and the unit price.

It is possible to perform control in consideration of the function of the load device 14, the requirements of the control target, or the like, and various control methods are considered according to the control target.

For example, in a case where the load device 14 is a cooling device 132, since the time period from 13 o'clock to 15 o'clock during which the power consumption exceeds the peak amount is in a time band at which the atmospheric temperature is high, if the operation of the cooling device 132 is stopped, the temperature inside the refrigerator of the vending machine 10 may increase. Accordingly, the temperature inside the refrigerator of the vending machine 10 is made lower than that at a normal time before the operation stop time band, whereby it is possible to prevent commodities in the refrigerator from becoming lukewarm even if the temperature rises. FIG. 8(c) shows an example of an operation schedule of the cooling device 132 at a normal time. In the example of FIG. 8(c), the operation is performed during a period between 10 o'clock to 16 o'clock. Accordingly, as shown in FIG. 8(d), the control unit 106 controls the operation of the cooling device 132 such that cooling operation is performed for a longer time (for seven hours) from an earlier time (6 o'clock). The control unit 106 further controls the operation of the cooling device 132 such that the cooling operation time is extended until later (to 18 o'clock) than the normal time (to 16 o'clock) to make up for the temperature inside the refrigerator of the vending machine 10 raised during the operation-stopped period (13 o'clock to 16 o'clock).

The operation time may be shifted such that the operation of the load device 14 is stopped for three hours during the period T1 (13 o'clock to 16 o'clock) high in the electricity price and the load device 14 is operated for three hours from 16 o'clock to 19 o'clock. However, if the power consumption does not exceed the threshold (NO in Step S117), the operation time may not be shifted (bypassing Step S119) even in a time band with a high electric price.

In this way, the operation of the load device 14 is changed from the past operation schedule of FIG. 8(c) to an operation schedule of FIG. 8(d). In FIG. 8(c) before the change, the load device 14 is operated for six hours from 10 o'clock to 16 o'clock. In contrast, in FIG. 8(d) after the change, the operation of the load device 14 is stopped for three hours from 13 o'clock to 16 o'clock, corresponding to the period T1, and is operated for seven hours from 6 o'clock to 13 o'clock and for two hours from 16 o'clock to 18 o'clock. Steps S115 to S119 of FIG. 7 correspond to Step S105 of FIG. 6.

With this control, as shown in FIG. 8(e), the transition of the power consumption of one day is changed, and it is possible to suppress the power consumption to be comparatively low at the peak time (period T1) to which a high electricity price is applied.

<Control Method Example 2>

Figure 9:
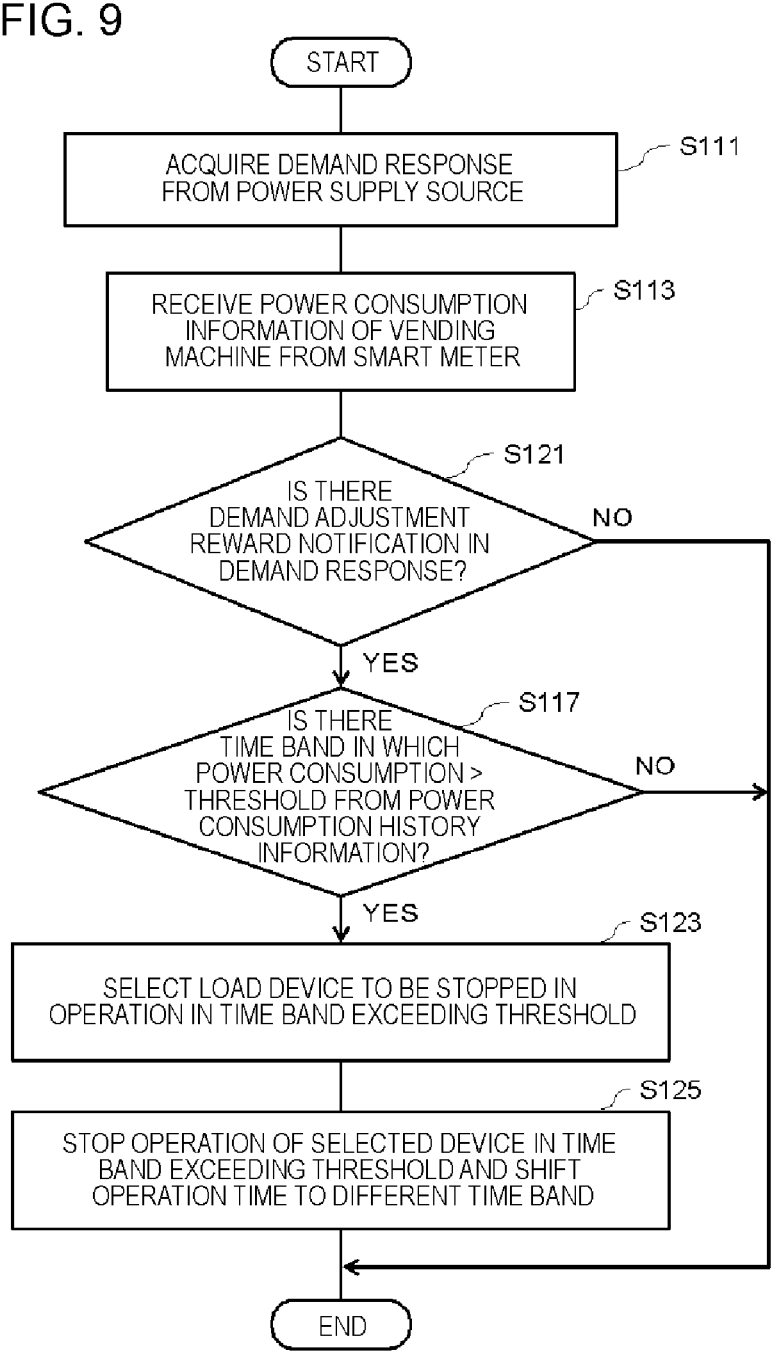
FIG. 9 is a flowchart showing an example of controlling the operation of the power control target by the control device according to the exemplary embodiment of the invention.

FIG. 9 is a flowchart of an example of a method of controlling the power control target by the control device 100 according to the exemplary embodiment of the invention.

In this example, it is assumed that the demand response indicates a notification of a reward in accordance with a demand adjustment, the notification indicating provision of an incentive in a case where the power consumption does not exceed a threshold W2. A load device which is subjected to operation control is selected such that the power consumption of the vending machine 10 does not exceed the threshold W2 designated by a demand adjustment based on the demand response indicating a notification of a reward in accordance with the demand adjustment. Steps S111 and S113 are the same as those in FIG. 7, and thus description thereof will not be repeated.

It is assumed that the demand response acquired in Step S111 includes a request for a demand adjustment and a notification of a reward in accordance with a load reduction (YES in Step S121).

The control unit 106 refers to the history information stored in the memory 114 and acquires transition information of the power consumption of one day in the past (for example, a previous day or the same day of the week in the previous week). Then, the control unit 106 determines whether or not there is a time band in which power is consumed in excess of the threshold W2 of the power consumption shown in the demand response (Step S117). In a case where there is a time band in which the power consumption exceeds the threshold W2 (YES in Step S117), the control unit 106 selects a device to be stopped in operation during this time band from out of the load devices 14 of the vending machines 10 (Step S123).

At this time, the control unit 106 determines the power consumption to be shifted, the load device 14 to be a control target, the time period to be stopped, the time or the length of the operation time after shifting, and the like based on information of both of the power consumption information and the unit price.

For example, in order to reduce the amount of power corresponding to the amount of power in excess of the threshold W2, the operation for the amount of power exceeding the threshold W2 may be shifted or distributed to another time band. Alternatively, in order to reduce the power consumption in the period during which the power consumption exceeds the threshold W2, the operation time band of the load device 14 may be shifted or distributed.

The control unit 106 determines the operation time band and the amount of power to be shifted such that the power consumption after shifting does not exceed the threshold W2 based on the history information of the power consumption.

In addition, for example, the control unit 106 may select a device to be stopped in operation by referencing a table in which an order of priority is defined in advance as shown in FIG. 10. The order of priority may be determined in advance for each type of the vending machine 10 or for each installation area of the vending machine 10. Different tables may be prepared according to season, time band, weather (atmospheric temperature), or the like, and a table according to season or weather may be selectively used. For example, the summer period may be given a low priority for stopping operation of the cooling device 132, nighttime may be given a low priority for stopping operation of an illumination device 136, and a day when the atmospheric temperature is low may be given a low priority for stopping operation of a heating device 134, or the like. Such tables may be downloaded from the management system 70 and may be updated.

The operation may be controlled not only by selecting a device to be stopped in operation but also by selecting operation modes of each device, for example, operation modes with different power consumptions, such as a normal mode, a high power mode, and a power saving mode as appropriate according to conditions. For example, control may be performed for switching from the normal mode to the power saving mode, such that the power consumption becomes equal to or less than the threshold without stopping the operation.

Returning to FIG. 9, the control unit 106 stops the operation of the selected load device 14 in a time band in excess of the threshold W2 and shifts the operation of the stopped load device 14 to another time band (Step S125). Steps S121 to S125 of FIG. 9 correspond to Step S105 of FIG. 6.

With this control, the transition of the power consumption of one day is changed, and it is possible to prevent the power consumption from exceeding the threshold W2. As a result, an incentive is given.

The timing of the control by the control unit 106 may be set as needed when change is required, for example, when the demand control information is received. Alternatively, control by the control unit 106 may be performed according to an operation plan set for the following day or the like.

As described above, the control device 100 of the exemplary embodiment of the invention has a configuration in which the communication module 110 (FIG. 4) is provided in the power control target (vending machine 10), the power consumption information of the vending machine 10 is received from the electric energy meter 42, such as the smart meter 40, through the first communication unit 120 (FIG. 4), and the demand control information is acquired from at least one power supply source 60. According to this configuration, the control device 100 may control the operation of the power control target (load device 14, storage battery 20, power generator 22, or the like) based on both of the power consumption information and the demand control information, thus allowing not only to shift the operation to a time band low in unit price, but also allowing to evaluate the actual power consumption. It is thus possible to dynamically suppress the power consumption of the power control target by finely and appropriately responding to fluctuations in power consumption, demand variations, or the like.

Furthermore, since the smart meter 40 has a function of storing the history information of the power consumption information over a predetermined period, it is preferable that the smart meter 40 is employed as the electric energy meter 42 and that the communication unit 102 receives the history information of the power consumption information from the smart meter 40. Since the history information stored in the smart meter 40 may be used for controlling the power control target, the control device 100, the communication module 110, or the vending machine 10 is not required to have a storage unit for storing the history information. With the use of the above-described function of the smart meter 40, it is possible to dynamically control the power consumption of the power control target by finely and appropriately responding to fluctuations in power consumption, demand variation, or the like while suppressing the memory capacity on the control side.

(Second Exemplary Embodiment)

Figure 11:
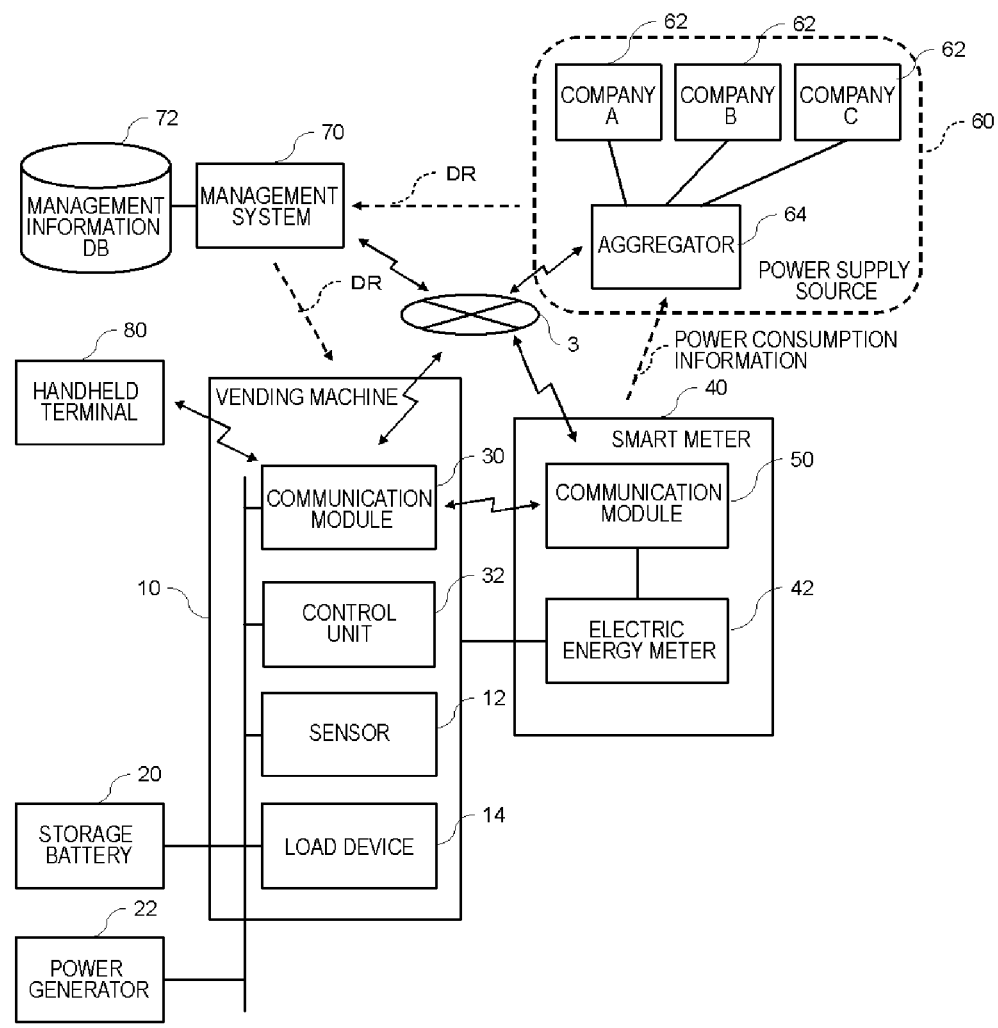
FIG. 11 is a block diagram showing a configuration example of a system which controls power of a vending machine using a control device according to an exemplary embodiment of the invention.
Figure 12:
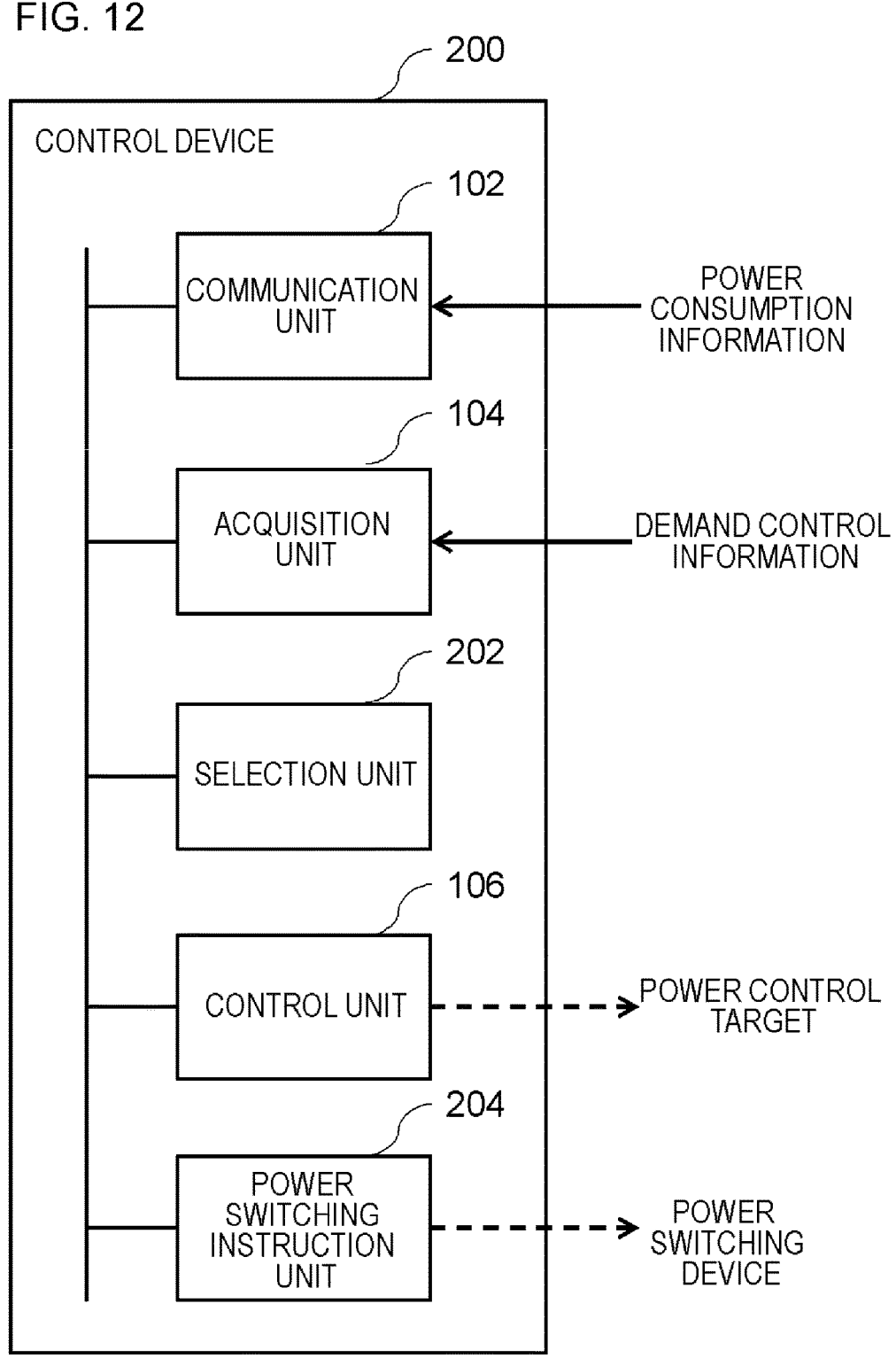
FIG. 12 is a functional block diagram showing a logical configuration of the control device according to the exemplary embodiment of the invention.

FIG. 11 is a block diagram showing a configuration example of a system which controls power of a vending machine 10 using a control device according to an exemplary embodiment of the invention. FIG. 12 is a functional block diagram showing a logical configuration of a control device 200 according to the exemplary embodiment of the invention.

In the above-described exemplary embodiment, a configuration in which power is supplied from one power supply source 60 has been described. The control device 200 according to the exemplary embodiment of the invention is different from the control device 100 of the above-described exemplary embodiment of FIG. 1 in that a power supply source from which power supply is received is selected from among a plurality of power supply sources 62 based on the demand control information.

Conventionally mainstream power systems in which power is supplied from a specific power company are moving toward an era of the consumers freely selecting the power supply source, and it is anticipated that the mechanism of power supply will undergo a great change. The consumer will be selecting a power supply source from among a plurality of power supply sources in consideration of advantages and disadvantages of each power company based on the electricity price, the incentive, stability of power supply, and the like.

There is a country employing a structure in which an organization called an aggregator mediates between plural power supply sources and the consumer to adjust and supply plural kinds of power supply to meet the needs of the consumer.

In such circumstances, it is desirable that a power supply source from which power supply is received may be selected from among a plurality of power supply sources.

As shown in FIG. 12, the control device 200 according to the exemplary embodiment of the invention includes the communication unit 102, the acquisition unit 104, and the control unit 106 the same as those in the above-described exemplary embodiment. The control device 200 further includes a selection unit 202 which selects at least one power supply source 62 from among a plurality of power supply sources 62 based on demand control information (in FIG. 11, indicated by "DR") from a plurality of power supply sources 62 (company A, company B, and company C of FIG. 11) acquired by the acquisition unit 104 and power consumption information received by the communication unit 102, and a power switching instruction unit 204 which instructs a power switching device (not shown) to switch, to power supplied from the selected power supply source 62, power supplied to the power control target.

The power switching device may be achieved by at least one of the smart meter 40, the management system 70, and the aggregator 64.

For example, the smart meter 40 may include a power switching device including a unit which receives power from a plurality of power supply sources 62, and a unit which switches among the electricity received from the plurality of power supply sources 62 and supplies the electricity to the vending machines 10.

Alternatively, the power switching instruction unit 204 of the control device 200 outputs a power switching instruction to at least one of the management system 70 and the smart meter 40. The management system 70 or the smart meter 40 includes a unit which transfers the switching instruction to the aggregator 64. The aggregator 64 includes a unit which receives the switching instruction, and a unit which transfers the switching instruction to a power supply system of the corresponding power supply source 62. The power switching device may be achieved by combining these units.

A specific method of switching power is not relevant to the essence of the invention, and thus detailed description thereof will not be provided.

There may be various conditions for selection of the power supply source 62 by the selection unit 202, an example thereof being illustrated below, but the invention is not limited thereto. The following conditions may be combined as appropriate within a range without any contradiction.

(g1) The unit price of the electricity is low (the unit price is equal to or less than a threshold).

(g2) Power supply is stable (output fluctuations are within a threshold) or power is not interrupted (output is equal to or greater than a threshold).

(g3) A load reduction instruction is not issued (a requested reduction amount is equal to or less than a threshold).

(g4) Power for necessary power consumption is supplied (output is equal to or greater than a threshold).

(g5) Satisfactory incentive (the user compares the contents of the agreement and sets the priority order in advance).

A control method of the control device 200 according to the exemplary embodiment of the invention configured as above will be described below.

Figure 13:
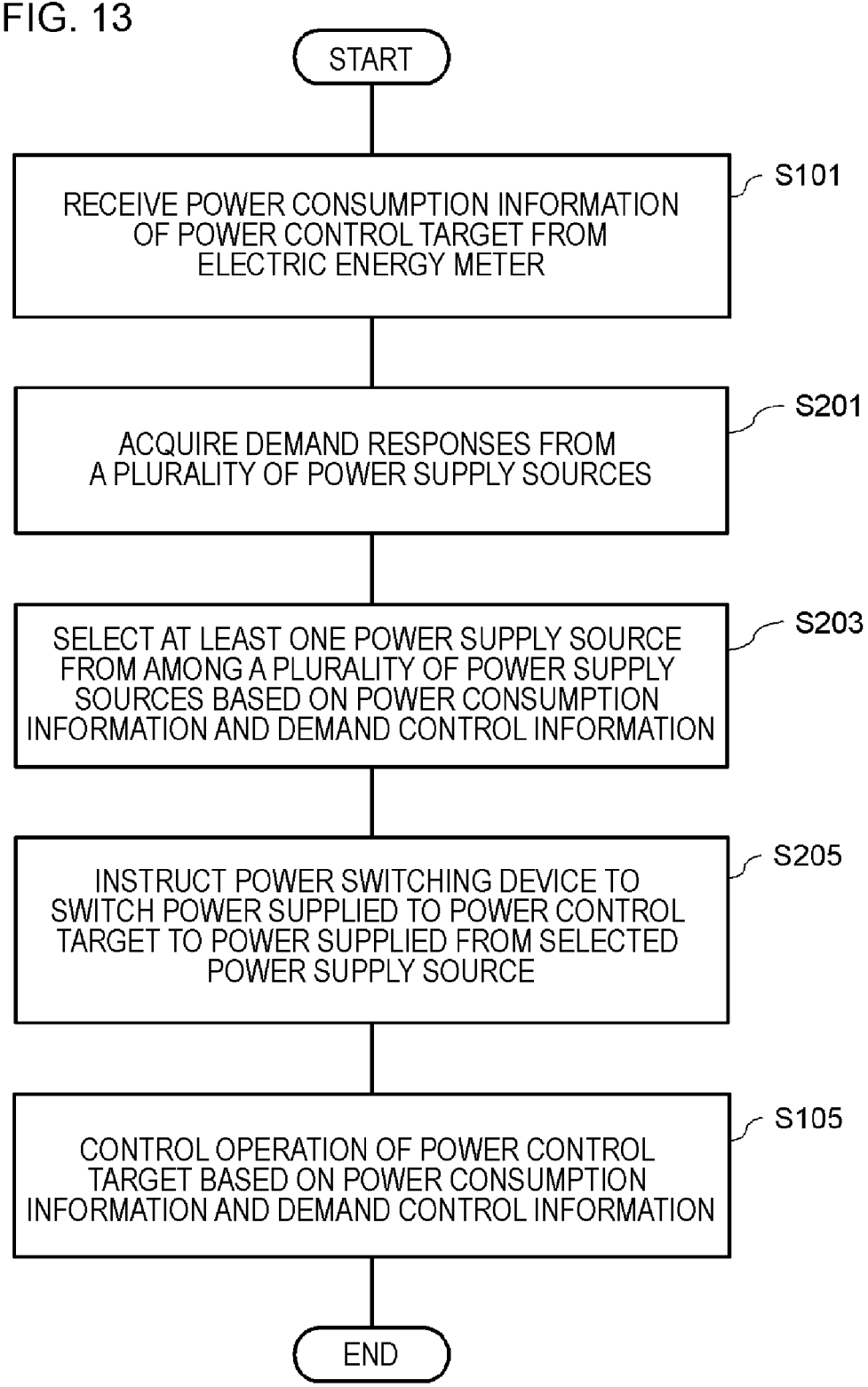
FIG. 13 is a flowchart showing an example of the operation of the control device according to the exemplary embodiment of the invention.

FIG. 13 is a flowchart showing an example of the operation of the control device 200 according to the exemplary embodiment of the invention.

The control method of this exemplary embodiment includes Steps S101 and S105 the same as those in the flowchart showing the operation procedure of the control device 100 of the above-described exemplary embodiment of FIG. 6, and further includes Steps S201 to S205.

The control method of this exemplary embodiment is configured such that the control device 200 receives the power consumption information of the power control target (vending machine 10) from the electric energy meter 42 (Step S101), acquires the demand control information from a plurality of power supply sources 62 (company A, company B, and company C of FIG. 11) (Step S201), selects at least one power supply source 62 from among the plurality of power supply sources 62 based on the demand control information from the plurality of power supply sources 62 and the power consumption information (Step S203), instructs the power switching device to switch, to power supplied from the selected power supply source 62, power supplied to the power control target (Step S205), and controls the operation of the power control target (vending machine 10) based on the power consumption information and the demand control information (Step S105).

In Step S203, the selection processing of the power supply source 62 by the selection unit 202 may be performed at the following timings. The following timings may be combined as appropriate within a range without any contradiction.

(h1) at regular intervals (at hourly intervals or the like)

(h2) at a predetermined time when the power supply schedule for the following day or the following week, for example, is determined (when the power supply source 62 is selected)

(h3) after the demand response is received from the power supply source 62

(h4) as needed, such as before a load (or power consumption) of the power control target changes significantly (prediction), or after the change (actual measurement)

(h5) as needed, such as before the amount of supplied power (or electricity price) for each power supply source 62 changes significantly (prediction), based on target information or in emergency (occurrence of disasters or accidents, sharp increase in fuel costs, or the like), or after the change (actual measurement)

(h6) an arbitrary date and time, a period, or the like when an incentive is applied As described above, according to the control device 200 of the exemplary embodiment of the invention, the same effects as in the above-described exemplary embodiment are obtained, and the following effects are further obtained.

Since the control device 200 is capable of selecting one power supply source from among a plurality of power supply sources 62 based on the demand control information and the power consumption information according to the needs of the user to receive a power supply, it is possible to suppress the electricity price and to receive a power supply at regular intervals.

In addition, according to the control device 200 of the exemplary embodiment of the invention, the consumer may dynamically select the adjustments in distribution of the power supply source 62 which has hitherto been managed by the aggregator 64.

(Third Exemplary Embodiment)

In the above-described exemplary embodiment, a configuration has been described in which control device controls operation of the power control target based on the demand control information and power consumption information of the power control target. A control device according to an exemplary embodiment of the invention is different from the control device of the above-described exemplary embodiment in that a plurality of power control targets exchange power consumption information. Thereby, the control device performs control in consideration of information of power control target(s) in the periphery of the power control target.

Hereinafter, in this exemplary embodiment, description will be provided assuming that a control device according to the present embodiment has the configuration of the control device 100 of the above-described exemplary embodiment of FIG. 1. However, the control device of this exemplary embodiment may include the configuration of the control device 200 of the above-described exemplary embodiment of FIG. 12.

In the control device 100 of this exemplary embodiment, the communication unit 102 further acquires at least one of power consumption information and operation information of another or other power control targets (vending machine(s) 10).

The control unit 106 further controls the operations of a plurality of power control targets (vending machines 10) based on at least one of the power consumption information and the operation information relating to the other power control target(s) (vending machine(s) 10).

The communication unit 102 may acquire at least one of the power consumption information and the operation information of the other power control target(s) (vending machine(s) 10) through the electric energy meter 42 (smart meter 40), or directly from the other power control target (s) (vending machine(s) 10). The communication unit 102 may have a function capable of acquiring information through both paths, or may select a path according to the situation and may acquire information through the selected path.

In a configuration in which information is exchanged through the smart meters 40, the smart meters 40 perform communication with each other using the first communication unit 150 (920 MHz) (FIG. 5) of the communication module 50 of each smart meter 40, and the smart meters 40 perform communication with the vending machines 10 using the first communication unit 150 (920 MHz) (FIG. 5) of the communication module 50 and the first communication unit (920 MHz) 120 (FIG. 4) of the communication module 30 of the vending machine 10.

In a configuration in which the vending machines 10 exchange information with each other, the vending machines 10 perform communication with each other using the first communication unit (920 MHz) 120 (FIG. 4) of the communication module 30 of each vending machine 10. Alternatively, the vending machines 10 may perform communication using the second communication unit (3G) 122 (FIG. 4) of the communication module 30 of each vending machine 10 through the public network 5 (FIG. 3).

Figure 14:
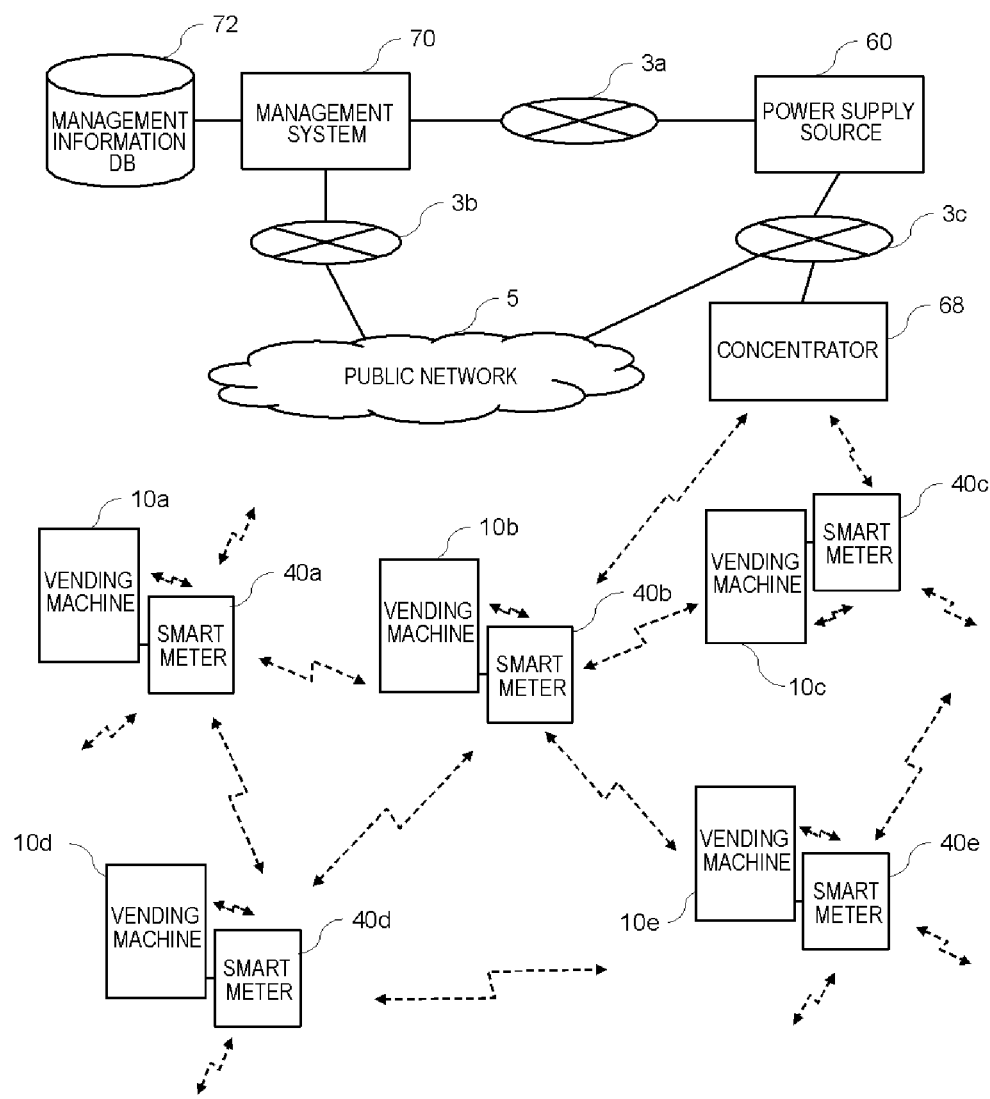
FIG. 14 is a diagram showing an example of a network configuration in a vending machine management system using the control device according to an exemplary embodiment of the invention.

FIG. 14 is a diagram showing an example of a network configuration in a vending machine management system using the control device according to the exemplary embodiment of the invention.

In FIG. 14, communication paths (arrows of solid lines and one-dot-chain lines) through which the vending machines 10 and the smart meters 40 of the above-described exemplary embodiment shown in FIG. 3 are connected to the respective networks 3 byway of the public network 5 are not shown. In FIG. 14, paths through which a plurality of smart meters 40 which are respectively connected to a plurality of vending machines 10 perform communication with each other and exchange information including at least one of the power consumption information and the operation information using the first communication unit 150 (920 MHz) of FIG. 5 are indicated by arrows of broken lines. Information may be exchanged between the respective smart meters 40 by multi-hop communication, aggregated in the concentrator 68, and transmitted to the power supply source 60.

In this exemplary embodiment, information exchanged among a plurality of smart meters 40 may be stored in the memory 144 (FIG. 5) of each smart meter 40.

The multi-hop communication method is not relevant to the essence of the invention, and thus detailed description thereof will not be provided.

The control unit 106 may predict the future power consumption of the power control target from the operation information of each power control target (vending machine 10). In this exemplary embodiment, the operation information includes at least one of the operation schedule of the power control target, the current operation situation, and the like.

The controlling contents of the power control target by the control unit 106 are illustrated below, but the invention is not limited thereto.

(i1) Controlling the total power consumption by distributing power from a power control target (vending machine 10) predicted as having surplus power (as having excessive supply of power or having a sufficient charge amount) to a power control target (vending machine 10) predicted as becoming insufficient in power (or currently insufficient in power).

Specifically, a power control target that is insufficient in power requests another power control target for power supply. In a case where power is divided from the vending machine 10 which has surplus power to the other power control target, it is desirable that the vending machines 10 are adjacent to each other and are connected by a dedicated power line or the like interchangeable power.

In a case where surplus power is predicted, surplus power may be sold and the amount may be used to purchase power for the vending machine 10 in which power is insufficient. As a result, it may be regarded that surplus power has been divided from the vending machine 10 which has surplus power to the vending machine 10 in which power is insufficient.

Alternatively, power interchange is performed such that power charged in the storage battery 20 of the vending machine 10 having surplus power is discharged to the vending machine 10 in which power is insufficient. Furthermore, power supplied to the vending machine 10 having surplus power may be decreased and power supplied to the vending machine 10 having insufficient power may be increased, without performing direct power interchange.

(i2) Distributing the load by shifting the operation time of the load device 14 for each power control target (vending machine 10).

(i3) Controlling the total power consumption by setting a high limit threshold for the vending machine 10 in a sales promotion area, reducing the operation stop time and setting a low threshold for the vending machine 10 in another area.

(i4) Notifying the situation of supply and demand (for example, power interruption or the like) of the power supply source to another power control target which receives power from another power supply source to supply power to one another according to the situation.

According to this configuration, since the power control target exchanges information with another or other power control targets, and operation is controlled in consideration of the information of peripheral power control target(s), it is possible for the targets to complement insufficient power with each other, or the like. As a result, efficient power control is performed.

In addition, in the control device 100 of this exemplary embodiment, the acquisition unit 104 further acquires a power control instruction from a management device (management system 70), in addition to the demand control information. The control unit 106 further controls the operations of a plurality of power control targets (vending machines 10) using the power control instruction.

In the invention, the power control instruction is information for instructing to control power of the vending machine 10 transmitted from the management system 70 to the vending machine 10.

The power control instruction may be transmitted from the management system 70 at regular intervals or as needed, or may be transmitted from the management system 70 in response to a request from the power control target (vending machine 10).

The power control instruction from the management system 70 is illustrated below, but the invention is not limited thereto.

(j1) an instruction to limit the power consumption (load reduction) for each area (or for each individual target)
(j2) an instruction to carry out an operation schedule for each area
(j3) an instruction according to the characteristics of an area For example, a suitable control instruction may be performed for each area, such as a tourist resort area, a downtown district, a shopping district, a commercial area, a residential area, an agricultural area, a mountainous area, alongside a main road, or a periphery of a parking area. For example, an instruction not to stop operation on holidays may be transmitted from the management system 70 to the vending machines 10 in a resort area.

According to the control device 100 of this exemplary embodiment, the same effects as in the above-described exemplary embodiment are obtained. In addition, the power control target is capable of grasping the situations of another or other power control targets, allowing control of the total power consumption for a plurality of power control targets. Thus, the effect of efficiently performing power control is obtained.

(Fourth Exemplary Embodiment)

A control device according to an exemplary embodiment of the invention is different from the control device of the above-described exemplary embodiment in that the operation of the power control target is controlled further in consideration of commodity information, such as the number of sales or the like of the vending machine 10 as the power control target. The control device of this exemplary embodiment may have the same configuration as one of the control devices of the above-described exemplary embodiments. Hereinafter, description will be provided assuming that the control device of this exemplary embodiment has the same configuration as the control device 100 of FIG. 1.

In this exemplary embodiment, the power control target is the vending machine 10.

The control device 100 further includes a commodity information acquisition unit (not shown) which acquires commodity information indicating fluctuations in the number of sales of commodities or in inventory quantity for each time period in the vending machine 10.

The control unit 106 further controls the operation of the vending machine 10 based on fluctuations in the number of sales of commodities or in inventory quantity.

Hereinafter, an example of controlling the control unit 106 is shown, but the invention is not limited thereto. The following control may be combined as appropriate within a range without any contradiction.

(k1) Not stopping operation of the load device 14 in a time band (or area) with a large number of sales.
(k2) Stopping operation of the load device 14 in a time band (or area) with a small number of sales.
(k3) Excluding the vending machine 10 with large fluctuations in inventory quantity from a target of load reduction since large fluctuations in inventory quantity requires adjustment in temperatures.
(k4) Stopping operation of the cooling device 132 or the heating device 134 of a vending machine 10 with few fluctuations in inventory quantity since when fluctuations in the inventory quantity are small, temperature adjusting processing may be cut back.

For example, even in a case where the unit price is high and the power consumption is equal to or greater than the threshold, if the cooling device 132 as the load device 14 of the vending machine 10 is stopped in a time band with a large number of sales, there is a risk of the commodities becoming lukewarm. Then, customers will avoid purchasing tepid commodities, the number of sales will decrease, and there would be a risk of losing opportunities of commodity sales. In a case where fluctuations in inventory quantity are small, it is anticipated that change in temperature inside the refrigerator of the vending machine 10 is small, and thus, even if the temperature adjustment processing is cut back, the commodity temperature may be maintained. Accordingly, in such a vending machine 10, the operation of the cooling device 132 or the heating device 134 as the load device 14 is stopped, whereby it is possible to suppress power consumption.

According to the control device 100 of this exemplary embodiment, the same effects as in the above-described exemplary embodiment are obtained, and in addition, since the operation is controlled in consideration of fluctuations in the number of sales or in inventory quantity of the vending machine 10, it is possible to perform more effective control of power consumption without losing the opportunity to sell a commodity, compared to a case where operation control is performed only based on the unit price and the power consumption.

(Fifth Exemplary Embodiment)

In the above-described exemplary embodiment, a configuration in which the management system 70 manages a plurality of power control targets (vending machines 10) has been described. A control device according to an exemplary embodiment of the invention is different from the above-described exemplary embodiment in that a configuration in which only the control device controls the operation of the power control target without management by the management system 70.

Figure 15:
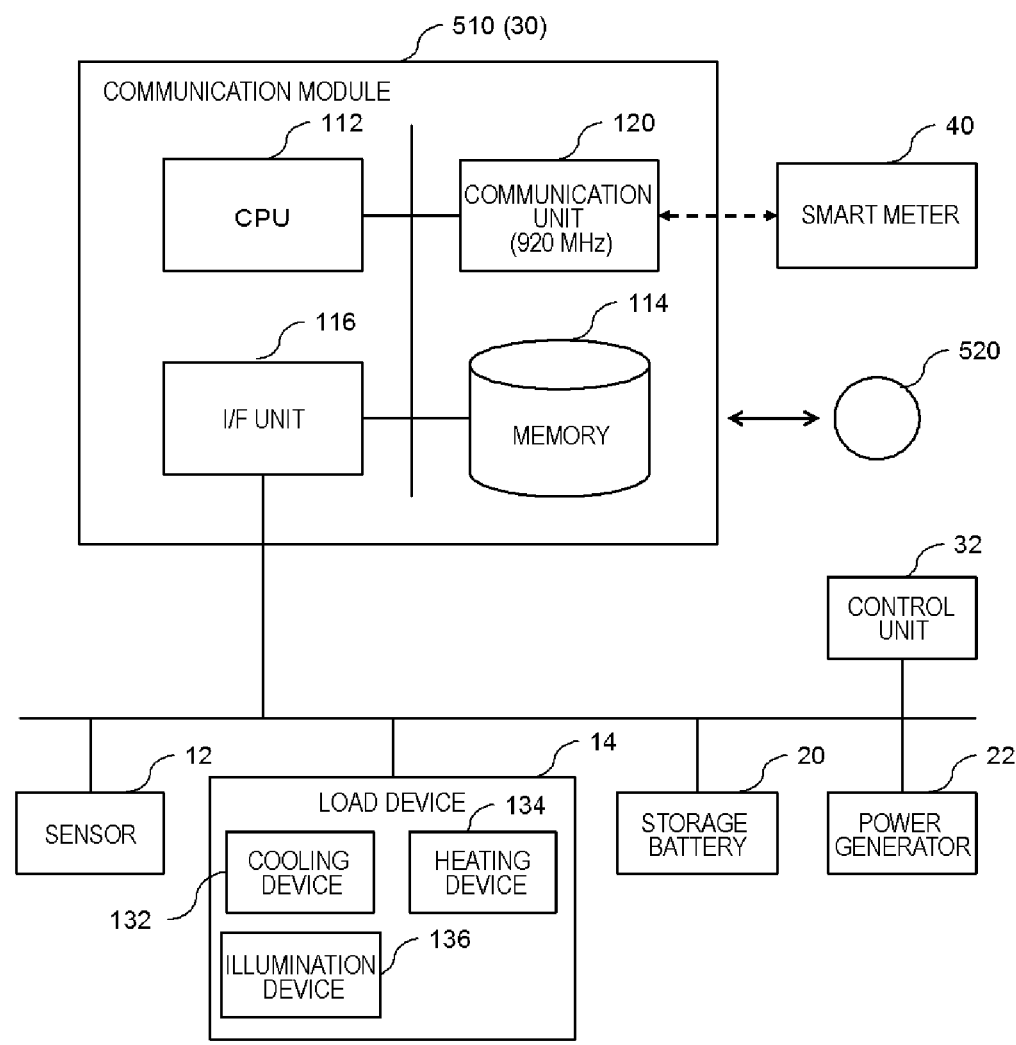
FIG. 15 is a block diagram showing the configuration of a communication module constituting the control device according to an exemplary embodiment of the invention.

FIG. 15 is a block diagram showing the configuration of a communication module 510 constituting the control device according to the exemplary embodiment of the invention.

The communication module 510 of this exemplary embodiment has a CPU 112, a memory 114, an I/F unit 116 and a first communication unit (920 MHz) 120 the same as those in the communication module 110 of FIG. 4. That is, the communication module 510 does not include the second communication unit (3G) 122 of the communication module 110 of FIG. 4.

The first communication unit 120 of the communication module 510 of FIG. 15 corresponds to the communication unit 102 or the acquisition unit 104 of the control device 100 of FIG. 1 or the control device 200 of FIG. 12 described above.

The respective constituent elements of the control device 100 of FIG. 1 or the control device 200 of FIG. 12 described above are realized by an arbitrary combination (so-called "firmware) of hardware and software of an arbitrary computer including the CPU 112, the memory 114, a program 520 which is loaded on the memory 114 and realizes the constituent elements of FIG. 1 or 12, a storage unit (not shown) which stores the program 520, such as a read only memory (ROM) or a flash memory, and the I/F unit 116 (or the first communication unit 120) shown in FIG. 15. Those skilled in the art will understand that there may be various modification examples to the method of realization thereof and the device.

In the communication module 510 (the control device 100 or the control device 200) of this exemplary embodiment, various units shown in FIG. 1 or 12 are realized as various functions by the CPU 112 executing various processing operations corresponding to the computer program 520.

A control method of the control device of this exemplary embodiment configured as above will be described below.

Figure 16:
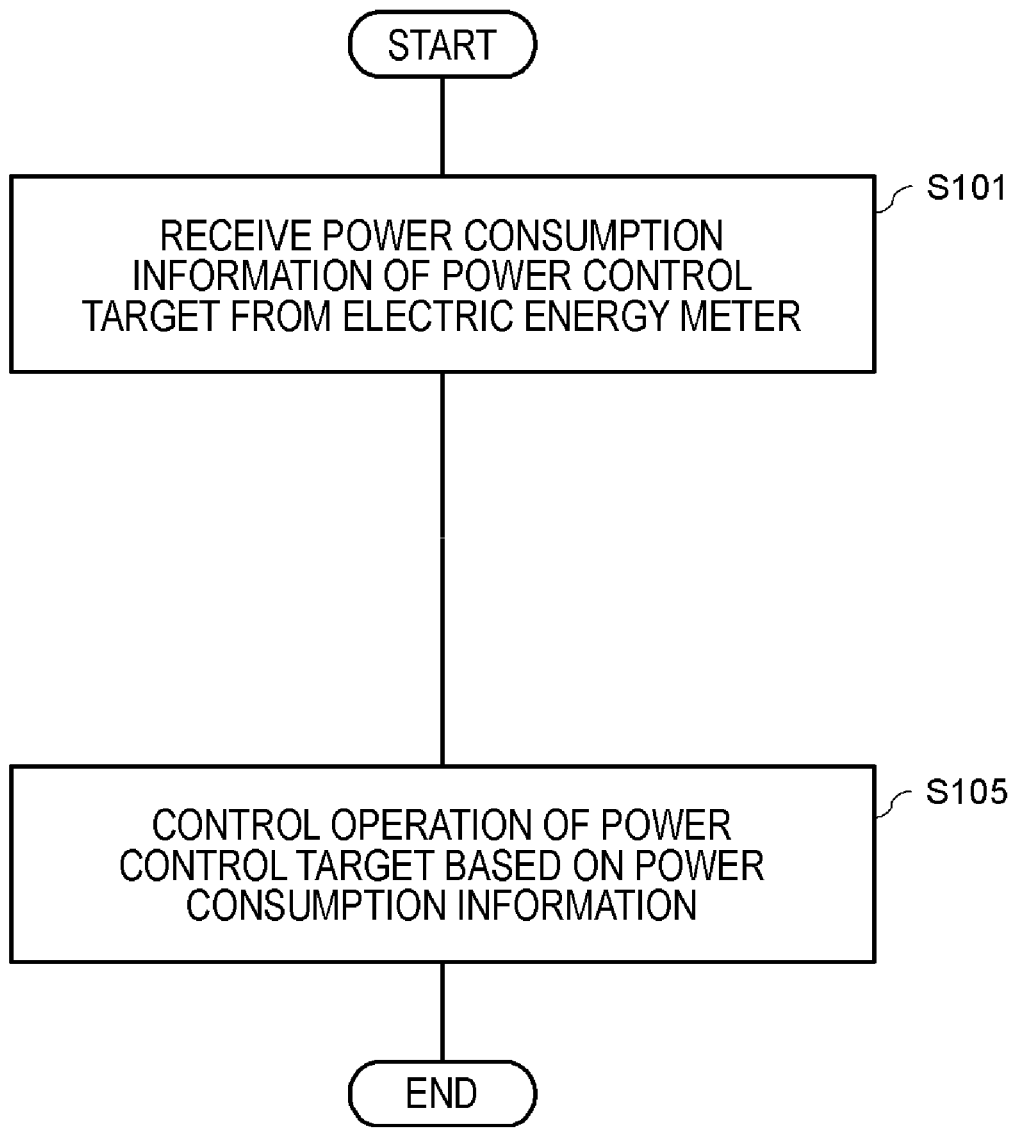
FIG. 16 is a flowchart showing an example of the operation of the control device of this exemplary embodiment.

FIG. 16 is a flowchart showing an example of the operation of the control device of this exemplary embodiment. In this example, control is performed without using the demand control information received from the power supply source 60 by way of the management system 70 or the smart meter 40 in the above-described exemplary embodiment.

The control method of this exemplary embodiment is configured such that the control device 100 (or the control device 200) receives the power consumption information of the power control target (vending machine 10) from the electric energy meter 42 (Step S101), and controls the operation of the power control target (vending machine 10) based on the power consumption information (Step S105).

According to this configuration, since the operation of the power control target is controlled based on the power consumption information, control is performed such that operation is stopped during a time band in which power consumption is likely to exceed the threshold, and the operation is shifted to another time band, whereby it is possible to suppress the power consumption peak to be low. Accordingly, it is possible to dynamically control power consumption as appropriate according to the situation of power supply and demand.

FIG. 17 is a flowchart showing an example of the operation of the control device of this exemplary embodiment. In this example, control is performed without using the power consumption information received from the smart meter 40 in the foregoing exemplary embodiments.

In a control method of this exemplary embodiment, the control device 100 (control device 200) acquires demand control information from at least one power supply source 60 (Step S103) and controls the operation of the power control target (vending machine 10) based on the demand control information (Step S105).

According to this configuration, since the operation of the power control target may be controlled in response to the demand control information, it is possible to dynamically and appropriately control power consumption according to the situation of power supply and demand.

Although the exemplary embodiments of the invention have been described referring to the drawings, these are illustrative of the invention, and various configurations other than the above configuration may be employed.
(Control based on Positional Information)

For example, at least one of the power control target, the control device, and the electric energy meter of the foregoing exemplary embodiments may include a global positioning system (GPS).

The control device may further include a positional information acquisition unit (not shown) which acquires positional information from the GPS.

Information of the current weather or atmospheric temperature, or a weather forecast may be acquired based on the positional information, and the operation of the load device 14 may be controlled in consideration of the information. The positional information may be transmitted from the vending machine 10 to the management system 70, and the management system 70 may transmit a power control instruction to the vending machine 10 in consideration of the positional information of the vending machine 10 and various kinds of information of an area obtained from the positional information, for example, information of weather or atmospheric temperature, power interruption information, and the like.

According to this configuration, it is possible to dynamically and appropriately perform power control from the positional information of the power control target in consideration of various situations.

EXAMPLES

Example 1

In this example, the demand control information which is notified from the power supply source 60 includes time band-based electricity price information.

The demand control information is distributed from the power supply source 60 through the management system 70 or the smart meter 40 and is acquired by the acquisition unit 104.

In this example, the control unit 106 stops the operation of the cooling device 132 and the heating device 134 based on the demand control information in a time band with a high electricity price.

Example 2

In this example, the demand control information which is notified from the power supply source 60 includes time band-based electricity price information.

The demand control information is distributed from the power supply source 60 through the management system 70 or the smart meter 40 and is acquired by the acquisition unit 104.

In this example, the control unit 106 controls the operation of the storage battery 20 such that the storage battery 20 is charged in a time band with a low electricity price, and the storage battery 20 is discharged in a time band with a high electricity price. Accordingly, it is possible to suppress the usage amount of electricity supplied from the power supply source 60 in a time band with a high electricity price.

Example 3

In this example, the demand control information notified from the power supply source 60 includes direct load control information at an area unit level or the like.

The demand control information is distributed from the power supply source 60 to the smart meter 40 in a target area, and is acquired by the acquisition unit 104 by way of the smart meter 40. At this time, the first communication unit 120 (920 MHz) of the communication module 110 receives the demand control information.

In this example, the control unit 106 controls the operation of the load device 14 according to the received direct load control information.

According to this configuration, it is possible to perform fine load control at an area unit level or the like at the time of power restriction or the like.

Example 4

In this example, it is assumed that while power of a company A as the power supply source 62 is being used, a company C as another power supply source 62 temporarily reduces an electricity price according to a time-limited offer or the like. This information is included in the demand control information, distributed by way of the management system 70 or the smart meter 40, and acquired by the acquisition unit 104.

In this example, the selection unit 202 selects the company C as the power supply source 62 in a time band of the time-limited offer of the company C, and gives notification to the power switching instruction unit 204. The power switching instruction unit 204 instructs the aggregator 64 to switch the power supply source 62 from the company A to the company C by way of the management system 70 or the smart meter 40.

The selection unit 202 selects the company A or the company B as the power supply source 62 when the time band of the time-limited offer of the company C ends, and gives notification to the power switching instruction unit 204. The power switching instruction unit 204 instructs the aggregator 64 to switch the power supply source 62 from the company C to the company A or the company B by way of the management system 70 or the smart meter 40.

According to this configuration, for example, in a case where a start-up company C temporarily reduces the electricity price by a time-limited offer or the like, since cheaper power is temporarily available, it is possible to efficiently reduce the electricity price.

Example 5

In this example, with regard to the company C dedicated to regenerated energy, a prediction of a sharp increase in the electric power rate or destabilization of power to be supplied is made by information of weather conditions or the like.

The selection unit 202 performs the above-described prediction by information of weather conditions or the like, selects the company A or the company B other than the company C based on a prediction result, and gives notification to the power switching instruction unit 204. The power switching instruction unit 204 instructs to switch the power supply source 62 to the company A or the company B by way of the management system 70 or the smart meter 40.

According to this configuration, a sharp increase in electric power rate of regenerated energy or destabilization of power supply is predicted based on information of weather conditions or the like, whereby it is possible to keep the electricity price to a proper price by switching to an appropriate power supply source 62, and to maintain stability of the power supply.

Although the invention has been described above referring to the exemplary embodiments and the examples, the invention is not limited to the above exemplary embodiments and the examples. The configurations and the details of the invention may be variously changed within the scope of the invention which those skilled in the art can understand.

In a case of acquiring and using information relating to a user in the invention, the information shall be legitimately used.

Hereinafter, examples of reference exemplary embodiments will be described additionally.

1. A control method of a control device, the method performed by the control device, comprising:
   receiving power consumption information of a power control target from an electric energy meter;
   acquiring demand control information from at least one power supply source; and
   controlling operation of the power control target based on the power consumption information and the demand control information.
2. The control method of a control device described in 1, the method performed by the control device, further comprising:
   selecting at least one power supply source from among a plurality of power supply sources based on the demand control information acquired from the plurality of power supply sources and the received power consumption information; and
   instructing a power switching device to switch, to power supplied from the selected power supply source, power supplied to the power control target.
3. The control method of a control device described in 1 or 2, the method performed by the control device, further comprising:
   further acquiring at least one of the power consumption information and operation information of another power control target; and further controlling respective operations of the plurality of power control targets based on at least one of the power consumption information or the operation information relating to the other power control target.
4. The control method of a control device described in 3, the method performed by the control device, further comprising
   acquiring at least one of the power consumption information or the operation information of the other power control target through the electric energy meter.
5. The control method of a control device described in 3 or 4, the method performed by the control device, further comprising directly acquiring at least one of the power consumption information or the operation information of the other power control target.
6. The control method of a control device described in any one of 3 to 5, the method performed by the control device, further comprising:
   further acquiring a power control instruction from a management device, and
   further controlling respective operations of the plurality of power control targets based on the power control instruction.
7. The control method of a control device described in any one of 1 to 6,
   wherein the demand control information includes information on electricity prices different for each time band, and
   the control device determines the future power consumption of the power control target in each time band based on the electricity prices and history information of the power consumption information of the power control target and controls operation of the power control target based on the determined power consumption.
8. The control method of a control device described in 7,
   wherein the control device stops operation of the power control target when it is determined that there is a time band in which the power consumption exceeds a predetermined value based on the history information of the power consumption information.
9. The control method of a control device described in any one of 1 to 8,
   wherein the demand control information includes information indicating that an incentive is given in a case where the power consumption of the power control target is equal to or less than a predetermined value, and
   the control device determines the future power consumption of the power control target based on the predetermined value and history information of the power consumption information of the power control target and controls operation of the power control target based on the determined power consumption.
10. The control method of a control device described in 9, the method performed by the control device, further comprising
    stopping operation of the power control target when it is determined that the power consumption exceeds the predetermined value based on the history information of the power consumption information.
11. The control method of a control device described in 10, the method performed by the control device, further comprising
    selecting a device to be stopped in operation from among devices consuming power based on target information.
12. The control method of a control device described in any one of 1 to 11,
    wherein the power control target is a vending machine, and
    the control device
    further acquires commodity information indicating a fluctuation in the number of sales of commodities or in inventory quantity by time in the vending machine, and
    further controls the operation of the power control target based on the fluctuation in the number of sales of commodities or in inventory quantity.
13. The control method of a control device described in any one of 1 to 12,
    wherein the control device is incorporated in the power control target or is provided outside the power control target.
14. The control method of a control device described in any one of 1 to 13,
    wherein the power control target has a temperature adjustment function, and
    the control device controls operation of the temperature adjustment function of the power control target.
15. The control method of a control device described in any one of 1 to 14,
    wherein the power control target includes a storage battery or a power generator, and the control device controls operation of the storage battery or the power generator.

16. The control method of a control device described in 2, wherein the electric energy meter includes a power switching device which switches, to power supplied from a plurality of power supply sources, power supplied to the power control target, and the control device instructs the power switching device to switch, to power supplied from the selected power supply source, power supplied to the power control target.

17. A program which causes a computer to execute:

a procedure to receive power consumption information of a power control target from an electric energy meter;

a procedure to acquire demand control information from at least one power supply source; and a procedure to control operation of the power control target based on the power consumption information and the demand control information.

18. The program described in 17, causing the computer to further execute:

a procedure to select at least one power supply source from among a plurality of power supply sources based on the acquired demand control information from the plurality of power supply sources and the received power consumption information; and a procedure to instruct a power switching device to switch, to power supplied from the selected power supply source, power supplied to the power control target.

19. The program described in 17 or 18, causing the computer to further execute:

a procedure to further acquire at least one of the power consumption information or operation information of another power control target; and a procedure to control respective operations of the plurality of power control targets based on at least one of the power consumption information and operation information relating to the other power control target.

20. The program described in 19, causing the computer to further execute a procedure to acquire at least one of the power consumption information and the operation information of the other power control target through the electric energy meter.

21. The program described in 19 or 20, causing the computer to further execute a procedure to directly acquire at least one of the power consumption information and the operation information of the other power control target.

22. The program described in any one of 19 to 21, causing the computer to further execute:

a procedure to further acquire a power control instruction from a management device; and a procedure to control respective operations of the plurality of power control targets based on the power control instruction.

23. The program described in any one of 17 to 22, wherein the demand control information includes electricity prices different for each time band, and the program causes the computer to further execute a procedure to determine the future power consumption of the power control target in each time band based on the electricity prices and history information of the power consumption information of the power control target and control operation of the power control target based on the determined power consumption.

24. The program described in 23, causing the computer to further execute a procedure to stop operation of the power control target when it is determined that there is a time band in which the power consumption exceeds a predetermined value based on the history information of the power consumption information.

25. The program described in any one of 17 to 24, wherein the demand control information includes information indicating that an incentive is given in a case where the power consumption of the power control target is equal to or less than a predetermined value, and the program causes the computer to further execute a procedure to determine the future power consumption of the power control target based on the predetermined value and history information of the power consumption information of the power control target and control operation of the power control target based on the determined power consumption.

26. The program described in 25, causing the computer to further execute a procedure to stop operation of the power control target when it is determined that the power consumption exceeds the predetermined value based on the history information of the power consumption information.

27. The program described in 26, causing the computer to further execute a procedure to select a device to be stopped in operation from among devices consuming power based on target information.

28. The program described in any one of 17 to 27, wherein the power control target is a vending machine, and the program causes the computer to further execute:

a procedure to acquire commodity information indicating a fluctuation in the number of sales of commodities or in inventory quantity for each time period in the vending machine; and a procedure to further control the operation of the power control target based on the fluctuation in the number of sales of commodities or in inventory quantity.

29. The program described in any one of 17 to 28, wherein the computer is incorporated in the power control target or is provided outside the power control target.

30. The program described in any one of 17 to 29, wherein the power control target has a temperature adjustment function, and the program causes the computer to further execute a procedure to control operation of the temperature adjustment function of the power control target.

31. The program described in any one of 17 to 30, wherein the power control target includes a storage battery or a power generator, and the program causes the computer to execute a procedure to control operation of the storage battery or the power generator.

32. The program described in 18, wherein the electric energy meter includes a power switching device which switches, to power supplied from a plurality of power supply sources, power supplied to the power control target, and the program causes the computer to further execute a procedure to instruct the power switching device to switch, to power supplied from the selected power supply source, power supplied to the power control target.

33. A control device comprising:

a communication unit which receives power consumption information of a power control target from an electric energy meter;

an acquisition unit which acquires demand control information from at least one power supply source; and a control unit which controls operation of the power control target based on the power consumption information and the demand control information.

34. The control device described in 33, further comprising:

a selection unit which selects at least one power supply source from among a plurality of power supply sources based on the demand control information from a plurality of power supply sources acquired by the acquisition unit and the power consumption information received by the communication unit; and a power switching instruction unit which instructs a power switching device to switch, to power supplied from the selected power supply source, power supplied to the power control target.

35. The control device described in 33 or 34, wherein the communication unit further acquires at least one of the power consumption information or operation information of another power control target, and the control unit further controls respective operations of the plurality of power control targets based on at least one of the power consumption information and operation information relating to the other power control target.

36. The control device described in 35, wherein the communication unit acquires at least one of the power consumption information and the operation information of the other power control target through the electric energy meter.

37. The control device described in 35 or 36, wherein the communication unit directly acquires at least one of the power consumption information and the operation information of the other power control target.

38. The control device described in any one of 35 to 37, wherein the acquisition unit further acquires a power control instruction from a management device, and the control unit further controls respective operations of the plurality of power control targets based on the power control instruction.

39. The control device described in any one of 33 to 38, wherein the power control target is a vending machine, the control device further includes a commodity information acquisition unit which acquires commodity information indicating a fluctuation in the number of sales of commodities or in inventory quantity by time in the vending machine, and the control unit further controls the operation of the power control target based on the fluctuation in the number of sales of commodities or in inventory quantity.

40. The control device described in any one of 33 to 39, wherein the control unit is incorporated in the power control target or is provided outside the power control target.

41. The control device described in any one of 33 to 40, wherein the power control target has a temperature adjustment function, and the control unit controls operation of the temperature adjustment function of the power control target.

42. The control device described in any one of 33 to 41, wherein the power control target includes a storage battery or a power generator, and the control unit controls operation of the storage battery or the power generator.

43. The control device described in 34, wherein the electric energy meter includes a power switching device which switches, to power supplied from a plurality of power supply sources, power supplied to the power control target, and the power switching instruction unit instructs the power switching device to switch, to power supplied from the selected power supply source, power supplied to the power control target.

The invention claimed is:

1. A control device configured to control a power control target, wherein:

the control device is configured to perform wireless communication with an electric energy meter having a function for performing wireless communication;

the control device comprises a communication module including a communication unit configured to perform wireless communication with at least one power supply source;

the communication module is incorporated in the power control target;

the electric energy meter is provided outside the power control target; and the control device comprises:

a reception unit configured to receive power consumption information of the power control target from the electric energy meter by using the communication unit;

an acquisition unit configured to acquire demand control information from the at least one power supply source by using the communication unit; and a control unit configured to control operation of the power control target based on the power consumption information and the demand control information.

2. The control device according to claim 1, further comprising:

a selection unit configured to select the at least one power supply source from among a plurality of power supply sources based on the demand control information from the plurality of power supply sources acquired by the acquisition unit and the power consumption information received by the reception unit; and a power switching instruction unit configured to instruct a power switching device to switch, to power supplied from the selected at least one power supply source, power supplied to the power control target.

3. The control device according to claim 1, wherein the communication unit of the communication module is configured to perform wireless communication with another power control target that is different from the power control target, the reception unit further receives at least one of the power consumption information and operation information of the another power control target, and the control unit is further configured to respectively control operations of the power control target and the another power control target based on at least one of the power consumption information and the operation information relating to the another power control target.

4. The control device according to claim 3, wherein the reception unit acquires at least one of the power consumption information and the operation information of the another power control target through the electric energy meter.

5. The control device according to claim 3, wherein the reception unit directly acquires at least one of the power consumption information and the operation information of the another power control target.

6. The control device according to claim 3,
wherein the control device is connected to a management device through a communication network,
the communication unit of the communication module performs wireless communication with the management device,
the acquisition unit further acquires a power control instruction from the management device, and
the control unit further controls respective operations of the power control target and the another power control target based on the power control instruction.

7. The control device according to claim 1,
wherein the demand control information includes electricity prices different for each time band, and
the control unit is configured to determine the future power consumption of the power control target in each time band based on the electricity prices and history information of the power consumption information of the power control target and to control operation of the power control target based on the determined power consumption.

8. The control device according to claim 7,
wherein the control unit is configured to stop operation of the power control target when it is determined that there is a time band in which the power consumption exceeds a predetermined value based on the history information of the power consumption information.

9. The control device according to claim 1,
wherein the demand control information includes information indicating that an incentive is given in a case where the power consumption of the power control target is equal to or less than a predetermined value, and
the control unit is configured to determine the future power consumption of the power control target based on the predetermined value and history information of the power consumption information of the power control target and to control operation of the power control target based on the determined power consumption.

10. The control device according to claim 9,
wherein the control unit is configured to stop operation of the power control target when it is determined that the power consumption exceeds the predetermined value based on the history information of the power consumption information.

11. The control device according to claim 10,
wherein the control unit is configured to select a device to be stopped in operation from among devices consuming power based on weather information.

12. The control device according to claim 1,
wherein the power control target is a vending machine,
the control device further comprises a commodity information acquisition unit configured to acquire commodity information indicating a fluctuation in the number of sales of commodities or in inventory quantity for each time period in the vending machine, and
the control unit is further configured to control the operation of the power control target based on the fluctuation in the number of sales of commodities or in inventory quantity.

13. The control device according to claim 1,
wherein the power control target has a temperature adjustment function, and
the control unit is configured to control operation of the temperature adjustment function of the power control target.

14. The control device according to claim 1,
wherein the power control target includes a storage battery or a power generator, and
the control unit is configured to control operation of the storage battery or the power generator.

15. The control device according to claim 2,
wherein the electric energy meter includes a power switching device which is configured to switch, to power supplied from the plurality of power supply sources, power supplied to the power control target, and
the power switching instruction unit is configured to instruct the power switching device to switch, to power supplied from the selected power supply source, power supplied to the power control target.

16. A control method performed by a control device to control a power control target, the method comprising:
performing wireless communication with an electric energy meter having a function for performing wireless communication;
performing wireless communication with at least one power supply source via a communication module including a communication unit, the communication module being incorporated in the power control target and the electric energy meter being provided outside the power control target;
receiving power consumption information of the power control target from the electric energy meter by using the communication unit;
acquiring demand control information from the at least one power supply source by using the communication unit; and
controlling operation of the power control target based on the power consumption information and the demand control information.

17. A non-transitory computer readable storage medium storing a program which, when executed by a computer, causes the computer to execute a method for controlling a power control target, comprising:
performing wireless communication with an electric energy meter having a function for performing wireless communication;
performing wireless communication with at least one power supply source via a communication module including a communication unit, the communication module being incorporated in the power control target and the electric energy meter being provided outside the power control target;
receiving power consumption information of the power control target from the electric energy meter by using the communication unit;
acquiring demand control information from the at least one power supply source by using the communication unit; and
controlling operation of the power control target based on the power consumption information and the demand control information.

* * * * *